(12) United States Patent
Hatch et al.

(10) Patent No.: US 8,416,133 B2
(45) Date of Patent: Apr. 9, 2013

(54) SYSTEM AND METHOD FOR COMPENSATING FOR FAULTY MEASUREMENTS

(75) Inventors: Ronald R. Hatch, Willington, CA (US); Liwen L. Dai, Chino Hills, CA (US)

(73) Assignee: Navcom Technology, Inc., Torrance, CA (US)

(*) Notice: Subject to any disclaimer, the term of this patent is extended or adjusted under 35 U.S.C. 154(b) by 211 days.

(21) Appl. No.: 12/898,629

(22) Filed: Oct. 5, 2010

(65) Prior Publication Data

US 2011/0090116 A1 Apr. 21, 2011

Related U.S. Application Data

(60) Provisional application No. 61/252,104, filed on Oct. 15, 2009.

(51) Int. Cl.
*G01S 19/20* (2010.01)
(52) U.S. Cl.
USPC .................................................. 342/357.58
(58) Field of Classification Search ............... 342/357.4, 342/357.58, 357.59, 357.63; 701/470, 471
See application file for complete search history.

(56) References Cited

U.S. PATENT DOCUMENTS

| 6,230,479 | B1 | 5/2001 | Kawamura et al. | 60/39.03 |
| 6,404,381 | B1 | 6/2002 | Heide et al. | 342/109 |
| 7,212,155 | B2 | 5/2007 | Hatch et a | 342/357.12 |
| 7,571,028 | B2 | 8/2009 | Lapinski et al. | 700/286 |
| 2006/0187017 | A1 | 8/2006 | Kulesz et al. | 340/506 |
| 2008/0270027 | A1 | 10/2008 | Stecko et al. | 701/214 |

OTHER PUBLICATIONS

International Search Report for International Application No. PCT/US2010/052161, dated Nov. 30, 2010.
Jang, C.W., et al. "Adaptive Fault Detection in Real-Time GPS Positioning," IEEE Proc. Radar Sonar Navig., vol. 147, No. 8, Oct. 2000, pp. 254-258.

*Primary Examiner* — Dao Phan
(74) *Attorney, Agent, or Firm* — Morgan, Lewis & Bockius LLP

(57) ABSTRACT

A system and method for compensating for faulty satellite navigation measurements. A plurality of measurements in a system is received for a measurement epoch. A Kalman filter is used to calculate a state of the system for the measurement epoch based on the plurality of measurements, wherein the state of the system for the measurement epoch is calculated using a first closed-form update equation. A faulty measurement is detected in the plurality of measurements for the measurement epoch and a revised state of the system for the measurement epoch that compensates for the faulty measurement is calculated, using the calculated state of the system for the measurement epoch as an input to the revised state calculation, and using a revised closed-form update equation comprising the first closed-form update equation modified with respect to the faulty measurement.

48 Claims, 18 Drawing Sheets

SYSTEM AND METHOD FOR COMPENSATING FOR FAULTY MEASUREMENTS

RELATED APPLICATIONS

This application claims priority to U.S. Provisional Application 61/252,104, "System and Method for Compensating for Faulty Satellite Navigation Measurements," filed Oct. 15, 2009, which is incorporated herein by reference in its entirety.

TECHNICAL FIELD

The disclosed embodiments relate generally to compensating for faulty measurements.

BACKGROUND

A Kalman filter may be used to solve for static and dynamic parameters in a dynamic system having noisy measurements. One such system is a Global Navigation Satellite System (GNSS), in which satellite navigation measurements are affected by several sources of noise (e.g., multipath effects, ionospheric effects, tropospheric effects, etc.). There are two major motivations for using a Kalman filter in solving for these static and dynamic parameters, which are generally referred to as a state vector, using measurements which are a function of those parameters. First, the Kalman filter allows for the insertion of statistical driving forces that affect the dynamic parameters. Second, the Kalman filter allows a set of measurements taken at a specific measurement epoch to be processed as single measurements rather than as a block of measurements, which require the inversion of matrices.

While the ability to process one measurement at a time is a distinct processing advantage for the Kalman filter, it presents a problem in that the measurement residuals with respect to the final measurement update of the state vector are not available until all the measurements of the measurement epoch have been processed. Unfortunately, faulty measurements cannot be detected until all of the measurements of the measurement epoch have been processed. However, once the faulty measurements have been processed, the effects of the faulty measurements on the state vector and covariance matrix have already been included into the state vector and covariance matrix, respectively. Removing the effects of the faulty measurements typically requires abandoning the measurement update of the state vector and the update of the covariance matrix for the measurement epoch, and reprocessing the entire measurement set without the faulty measurements. However, reprocessing all the measurements for a measurement epoch can be computationally expensive and time consuming. For example, consider a Kalman filter that tracks the orbits of 30 global navigation satellites using 80 reference stations located around the world. In this example, approximately 800 satellite navigation measurements are processed during each measurement epoch (e.g., based on an average of 10 global navigation satellites in view at each of the 80 reference stations). If both refraction corrected code measurements and refraction corrected carrier phase measurements are processed 1,600 measurements are processed at each measurement epoch. Thus, reprocessing the entire measurement epoch to remove the faulty measurements is not a practical solution.

Hence, it is highly desirable to provide a system and method to compensate for faulty measurements without the aforementioned problems.

SUMMARY

To address the aforementioned problems, some embodiments provide a system, a computer readable storage medium including instructions, and a computer-implemented method for compensating for faulty satellite navigation measurements. A plurality of measurements in a system is received for a measurement epoch. A Kalman filter is used to calculate a state of the system for the measurement epoch based on the plurality of measurements, wherein the state of the system for the measurement epoch is calculated using a first closed-form update equation. A faulty measurement is detected in the plurality of measurements for the measurement epoch and a revised state of the system for the measurement epoch that compensates for the faulty measurement is calculated, using the calculated state of the system for the measurement epoch as an input to the revised state calculation, and using a revised closed-form update equation comprising the first closed-form update equation modified with respect to the faulty measurement.

In some embodiments, the faulty measurement in the plurality of measurements for the measurement epoch is detected as follows. For each measurement in the plurality of measurements, an outlier bias for the measurement is calculated. It is determined whether the outlier bias for the measurement is greater than a first threshold. If the outlier bias for the measurement is greater than the first threshold, it is determined that the measurement is a faulty measurement.

In some embodiments, the revised state of the system for the measurement epoch that compensates for the faulty measurement is calculated as follows. It is determined whether the outlier bias for the faulty measurement is above a second threshold, wherein the second threshold is greater than the first threshold. If the outlier bias is greater than the second threshold, the effect of the faulty measurement is removed from the state of the system by: calculating a revised Kalman gain corresponding to the faulty measurement using the negative of a value of a covariance for the faulty measurement, where the covariance for the faulty measurement is determined from a covariance matrix corresponding to the calculated state of the system, revising the first closed-form update equation based on the revised Kalman gain to produce a revised first closed-form update equation, and calculating the revised state of the system by applying the revised first closed-form update equation to the calculated state of the system for the measurement epoch to remove the effect of the faulty measurement from the state of the system.

In some embodiments, a second closed-form update equation based on the revised Kalman gain is revised to produce a revised second closed-form update equation. A revised covariance matrix associated with the revised state of the system is then calculated by applying the revised second closed-form update equation to a covariance matrix associated with the state of the system for the measurement epoch to remove the effect of the faulty measurement from the covariance matrix associated with the state of the system.

In some embodiments, the second threshold is a minimum detectable error threshold.

In some embodiments, if the outlier bias is between the first threshold and the second threshold, the effect of the faulty measurement on the state of the system is reduced by: calculating a revised Kalman gain corresponding to the faulty measurement using a fraction of the value of the covariance for the faulty measurement, revising the first closed-form update equation based on the revised Kalman gain to produce a revised first closed-form update equation, and calculating the revised state of the system by applying the revised first closed-form update equation to the calculated state of the system for the measurement epoch to reduce the effect of the faulty measurement on the state of the system.

In some embodiments, a second closed-form update equation is revised based on the revised Kalman gain to produce a revised second closed-form update equation and a revised covariance matrix associated with the revised state of the system is calculated by applying the revised second closed-form update equation to a covariance matrix associated with the state of the system for the measurement epoch to reduce the effect of the faulty measurement on the covariance matrix associated with the state of the system.

In some embodiments, if the outlier bias is below the first threshold, it is determined that the measurement is not a faulty measurement.

In some embodiments, the system is a satellite navigation receiver, wherein the plurality of measurements comprise measurements of signals received from a plurality of global navigation satellites, and wherein the state of the satellite navigation receiver includes a position of the satellite navigation receiver, a velocity of the satellite navigation receiver, and a time.

In some embodiments, correction signals that compensate for errors in predicted orbits and clocks of the plurality of global navigation satellites are received and the state of the satellite navigation receiver are adjusted based on the correction signals.

In some embodiments, the system is a plurality of global navigation satellites, wherein the plurality of measurements comprise measurements of signals received from the plurality of global navigation satellites, and wherein the state of the plurality of global navigation satellites includes a position of each global navigation satellite in the plurality of global navigation satellites, a velocity of each global navigation satellite in the plurality of global navigation satellites, and a time reported by each global navigation satellite in the plurality of global navigation satellites.

In some embodiments, the revised state of the plurality of global navigation satellites is used to calculate correction signals that compensate for errors in predicted orbits and clocks of the plurality of global navigation satellites and the correction signals are transmitted to one or more satellite navigation receivers.

In some embodiments, the system includes a power distribution network comprising one or more power plants and one or more power grids, wherein the plurality of measurements is received from a plurality of sensors for a power distribution network, and wherein the state of the system comprises a state of the power distribution network and includes a magnitude, frequency, and phase relationship of the one or more power plants, fuel flow to power generators of the one or more power plants, and an amount of power drawn by the power grid.

In some embodiments, the system is a weather system, wherein the plurality of measurements is received from a plurality of meteorological sensors distributed across a plurality of geographic locations in the weather system, and wherein the state of the weather system includes air temperature and wind speed at the plurality of geographic locations.

In some embodiments, the system is a radar system, wherein the plurality of measurements includes radar signals reflected from plurality of radar targets, and wherein the state of the radar system includes a distance to each radar target, a velocity of each radar target, and a time.

BRIEF DESCRIPTION OF THE DRAWINGS

Like reference numerals refer to corresponding parts throughout the drawings.

DESCRIPTION OF EMBODIMENTS

Some embodiments provide a system, computer readable storage medium including instructions, and a computer-implemented method for compensating for the effects of faulty satellite navigation measurements on the calculated state of a plurality of global navigation satellites and a corresponding covariance matrix for the state of the plurality of global navigation satellites by reprocessing only those measurement that are determined to be faulty measurements. Some embodiments provide a system, computer readable storage medium including instructions, and a computer-implemented method for compensating for the effects of faulty satellite navigation measurements on the calculated state of a satellite navigation receiver and a corresponding covariance matrix for the state of the satellite navigation receiver by reprocessing only those measurement that are determined to be faulty measurements. These embodiments reduce the unnecessary processing required by the brute force technique described above.

Figure 1A:
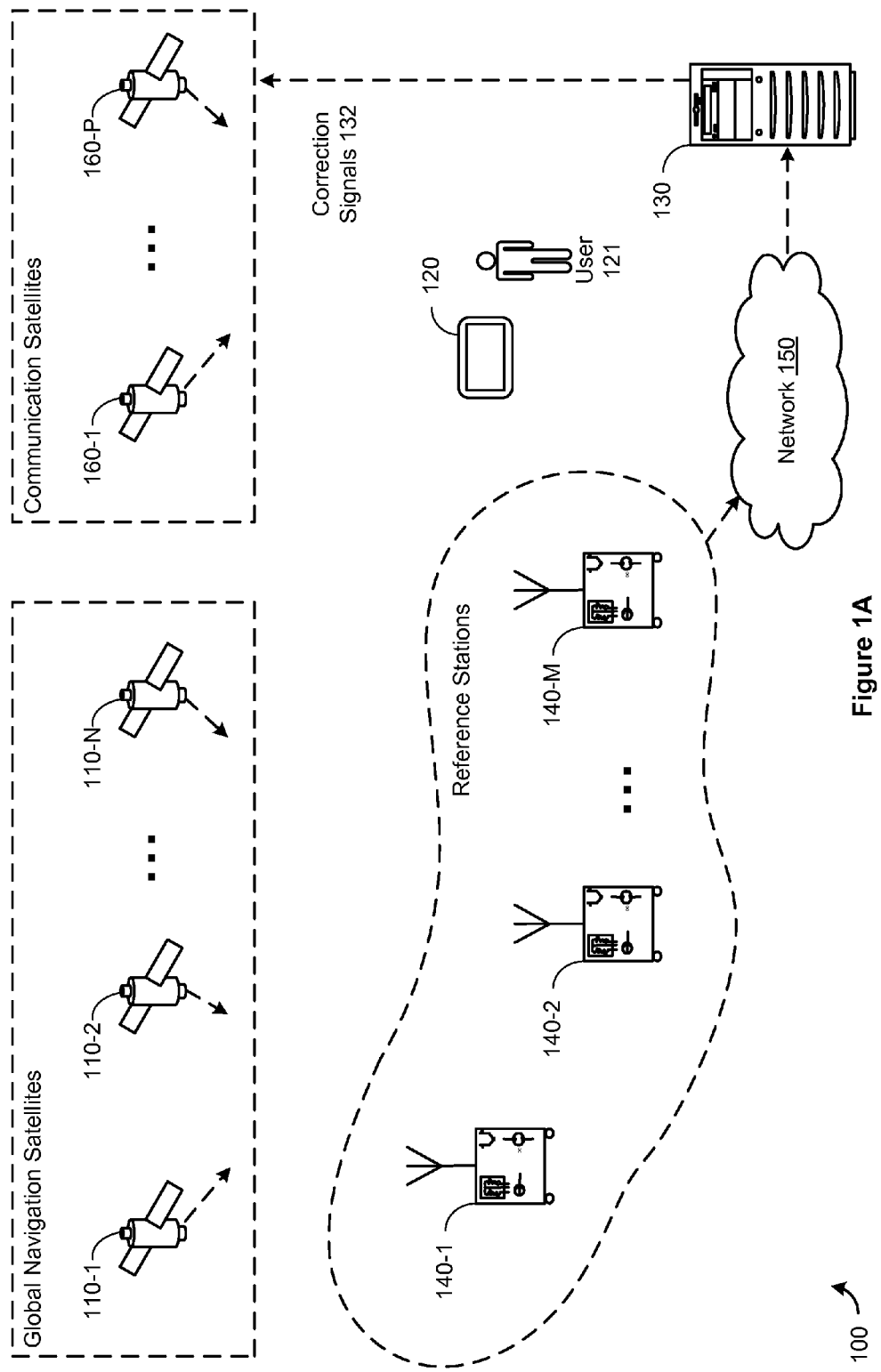
FIG. 1A is a block diagram illustrating global satellite navigation system, according to some embodiments.

FIG. 1A is a block diagram illustrating global satellite navigation system 100, according to some embodiments. The global satellite navigation system 100 includes global navigation satellites 110-1 to 110-N. The global navigation satellites 110-1 to 110-N each transmit at least two carrier signals. In the case of the Global Positioning System (GPS), the at least two carrier signals include the L1 and L2 signals having frequencies of 1.5754 GHz and 1.2276 GHz, and wavelengths of 0.1903 m and 0.2442 m, respectively. The next generation GPS will offer a third carrier signal, L5, that will have a frequency of 1.1765 GHz, and a wavelength of 0.2548 m. Note that although the embodiments described herein are described with respect to GPS, other Global Navigation Satellite Systems (GNSS), such as GLONASS and Galileo, may be used.

In some embodiments, the carrier signals are received by a satellite navigation receiver 120. The satellite navigation receiver may be used by a user 121 for navigation or for determining a current position of the user 121. In order to perform navigation and/or position determination operations, the satellite navigation receiver 120 receives signals from a subset of the global navigation satellites 110-1 to 110-N (i.e., the subset includes the global navigation satellites in view of the satellite navigation receiver 120). The satellite navigation receiver 120 then makes satellite navigation measurements based on the signals and calculates a state of the satellite navigation receiver 120 based on the satellite navigation measurements. In some embodiments, the state of the satellite navigation receiver includes a position of the satellite navigation receiver (e.g., X, Y, and Z, or latitude, longitude, and zenith components of position), a velocity of the satellite navigation receiver, and a time. The satellite navigation receiver 120 is described in more detail below with respect to FIG. 2.

In some embodiments, the carrier signals are received by reference stations 140-1 to 140-M at known locations (e.g., surveyed locations). The reference stations include a GNSS receiver that receives signals from the global navigation satellites 110-1 to 110-N. At any one time, the GNSS receiver receives signals only from the global navigation satellites 110 that are in view of the receiver's antenna. Reference stations 140-1 to 140-M are typically used to perform differential GPS operations and/or to track the orbits of global navigation satellites 110-1 to 110-N. In order to perform these operations, each of the reference stations 140-1 to 140-M receive signals from a subset of the global navigation satellites 110-1 to 110-N (i.e., the subset of global navigation satellites 110-1 to 110-N that are in view of each of the reference stations 140-1 to 140-M) and makes satellite navigation measurements based on the signals. In some embodiments the reference stations 140-1 to 140-M transmit the satellite navigation measurement to a computer system 130 via network 150. In some embodiments, reference stations 140-1 to 140-M perform differential GPS operations and transmit corrections to satellite navigation receiver 120.

In some embodiments, computer system 130 processes the satellite navigation measurements received from reference stations 140-1 to 140-M to determine the state of global navigation satellites 110-1 to 110-N. In some embodiments, the state of the global navigation satellites includes a position of each of global navigation satellites 110-1 to 110-N (e.g., X, Y, and Z, or latitude, longitude, and zenith components of position), a velocity of each of the global navigation satellites 110-1 to 110-N, and a time. Computer system 130 then generates correction signals 132 (sometimes called aiding signals) that correct for orbital deviations of global navigation satellites 110-1 to 110-N. Note that errors in predicted orbits and clocks of global navigation satellites 110-1 to 110-N are referred to as orbital deviations in this specification. Computer system 130 sends correction signals 132 to communication satellites 160-1 to 160-P, which in turn, transmit correction signals 132 to satellite navigation receiver 120 and/or reference stations 140-1 to 140-M. Alternatively, computer system 130 sends correction signals 132 to satellite navigation receiver 120 and/or reference stations 140-1 to 140-M via a network (e.g., network 150). Computer system 130 is described in more detail below with respect to FIG. 3A.

Network 150 can generally include any type of wired or wireless communication channel capable of coupling together computing nodes. This includes, but is not limited to, a local area network, a wide area network, or a combination of networks. In some embodiments, network 150 includes the Internet.

Note that there are two types of GPS measurements (i.e., satellite navigation measurements) that are usually made (e.g., by the satellite navigation receiver 120 and/or the reference stations 140-1 to 140-M): pseudorange measurements and carrier phase measurements. The operations used to determine the state of the satellite navigation receiver 120 and the operations used to determine the state of the global navigation satellites 110-1 to 110-N based on these satellite navigation measurements are well-known in the art and therefore a detailed explanation of those operations is not provided in this specification.

Figure 1B:
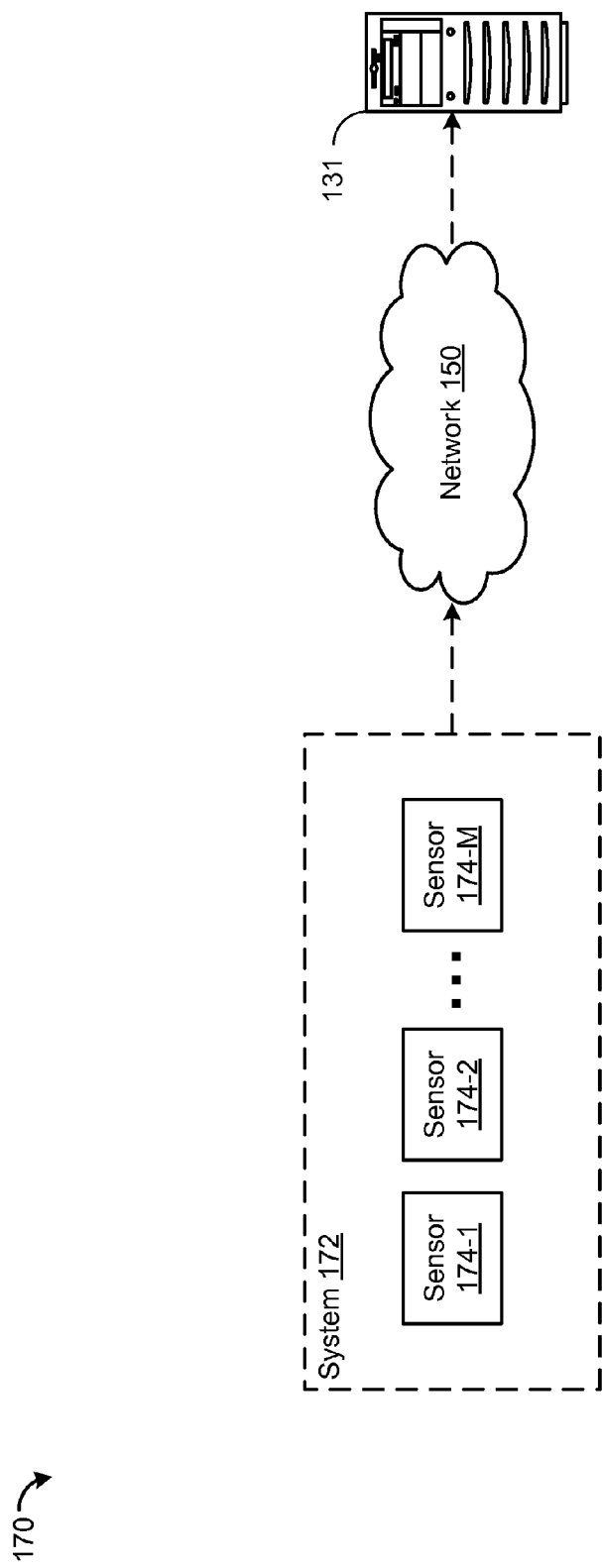
FIG. 1B is a block diagram illustrating a system, according to some embodiments.

FIG. 1B is a block diagram illustrating system 172, according to some embodiments. System 172 includes sensors 174-1 to 174-M. The sensors 174-1 to 174-M may be any type of physical sensor or operating condition sensor, such as accelerometers, magnetometers, gyroscopes, temperature sensors, software sensors (e.g., CPU load, memory usage, disk usage, bandwidth monitor, etc.), volume sensors, weight sensors, satellite navigation signal sensors, etc. Each of the sensors 174-1 to 174-M produces one or more measurements of their respective physical variables or operating condition variables during a measurement epoch. Sensors 174-1 to 174-M transmit their respective measurements to a computer system 131 for processing via the network 150.

Figure 2:
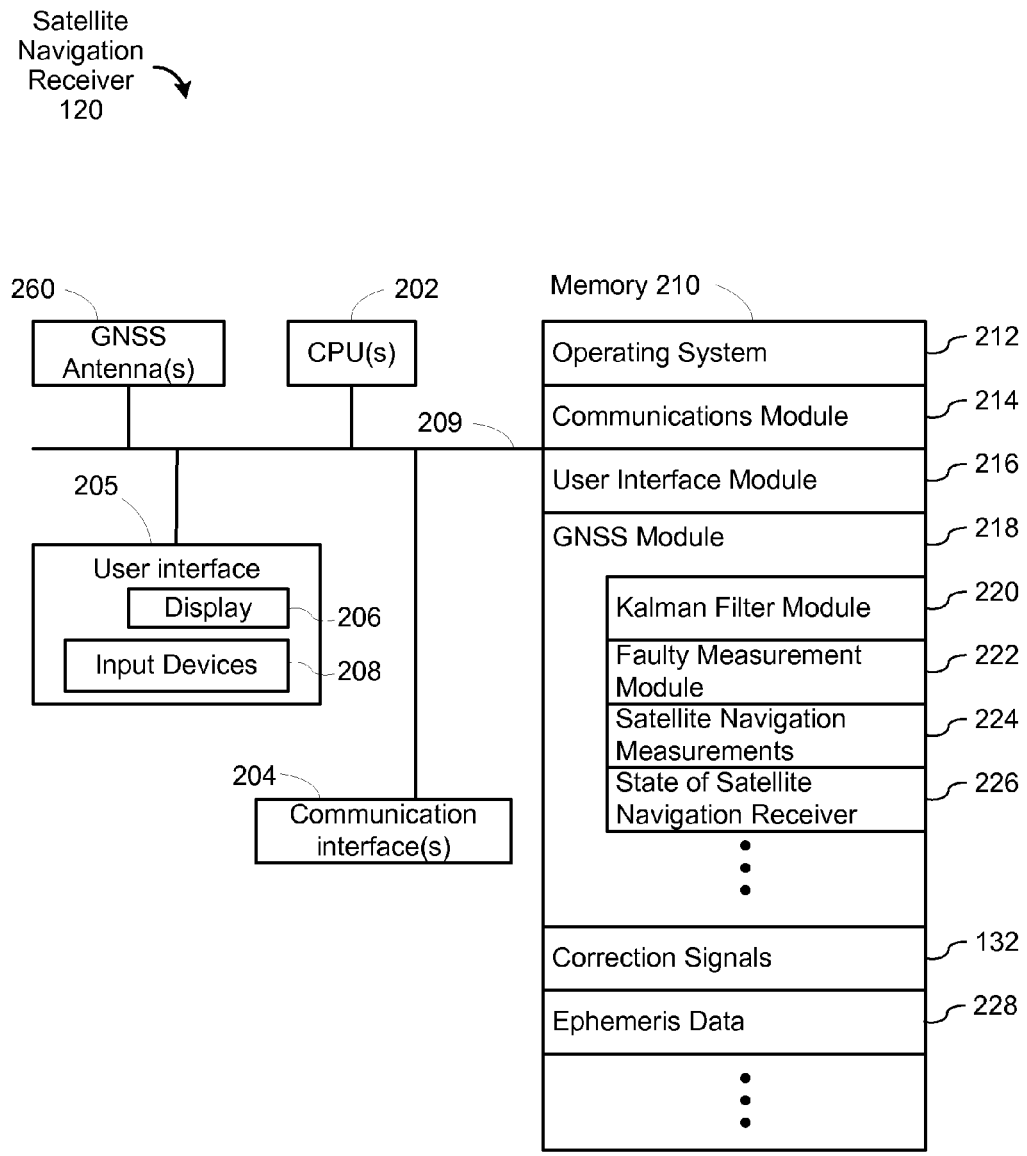
FIG. 2 is a block diagram illustrating a satellite navigation receiver, according to some embodiments.

FIG. 2 is a block diagram illustrating the satellite navigation receiver 120, according to some embodiments. The satellite navigation receiver 120 typically includes one or more processing units (CPU's) 202, one or more network or other communications interfaces 204, memory 210, and one or more communication buses 209 for interconnecting these components. The communication buses 209 may include circuitry (sometimes called a chipset) that interconnects and controls communications between system components. The satellite navigation receiver 120 optionally may include a user interface 205 comprising a display device 206 and one or more input devices 208 (e.g., one or more of a keyboard, mouse, touch screen, keypad, etc.). The satellite navigation receiver 120 also includes one or more GNSS antennas configured to receive signals transmitted by the global navigation satellites 110-1 to 110-N. Memory 210 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 210 may optionally include one or more storage devices remotely located from the CPU(s) 202. Memory 210, or alternately the non-volatile memory device(s) within memory 210, comprises a non-transitory computer readable storage medium. In some embodiments, memory 210 or the computer readable storage medium of memory 210 stores the following programs, modules and data structures, or a subset thereof:

- an operating system 212 that includes procedures for handling various basic system services and for performing hardware dependent tasks;
- a communication module 214 that is used for connecting the satellite navigation receiver 120 to other computer systems via the one or more communication interfaces 204 (wired or wireless) and one or more communication networks, such as the Internet, other wide area networks, local area networks, metropolitan area networks, and so on;
- a user interface module 216 that receives commands from the user via the input devices 208 and generates user interface objects in the display device 206;
- a GNSS module 218 that receives and processes signals from the global navigation satellites 110-1 to 110-N via one or more GNSS antennas 260, the GNSS module 218 including a Kalman filter module 220 configured to estimate a state 226 of the satellite navigation receiver 120 based on satellite navigation measurements 224 obtained from signals received from the global navigation satellites 110 in view of the receiver's antenna 260, and a faulty measurement module 222 that detects and compensates for faulty measurements (as described in more detail below with respect to FIGS. 12-19);
- ephemeris data 228, which includes a set of parameters used by the receiver 120 to predict orbits and clocks of the global navigation satellites; and
- correction signals 132 (e.g., signals received from a service that provides GNSS correction signals, as represented by system 130 in FIG. 1A) for errors in the predicted orbits and clocks of the global navigation satellites 110-1 to 110-N.

In some embodiments, the correction signals 132 include corrections not only for errors in the predicted orbits (e.g., orbital position and velocity) and clocks of the satellites, but also for corrections to compensate for tropospheric effects and ionospheric effects, satellite wide lane and narrow lane fractional phase biases, and/or inter-frequency biases in the code and carrier phase measurements.

Each of the above identified elements may be stored in one or more of the previously mentioned memory devices, and corresponds to a set of instructions for performing a function described above. The set of instructions can be executed by one or more processors (e.g., the CPUs 202). The above identified modules or programs (i.e., sets of instructions) need not be implemented as separate software programs, procedures or modules, and thus various subsets of these modules may be combined or otherwise re-arranged in various embodiments. In some embodiments, memory 210 may store a subset of the modules and data structures identified above. Furthermore, memory 210 may store additional modules and data structures not described above.

Although FIG. 2 shows a "satellite navigation receiver," FIG. 2 is intended more as functional description of the various features which may be present in a satellite navigation receiver than as a structural schematic of the embodiments described herein. In practice, and as recognized by those of ordinary skill in the art, items shown separately could be combined and some items could be separated.

In some embodiments, each of the reference stations 140-1 to 140-M includes a satellite navigation receiver that includes components and modules as described with respect to FIG. 2.

Figure 3A:
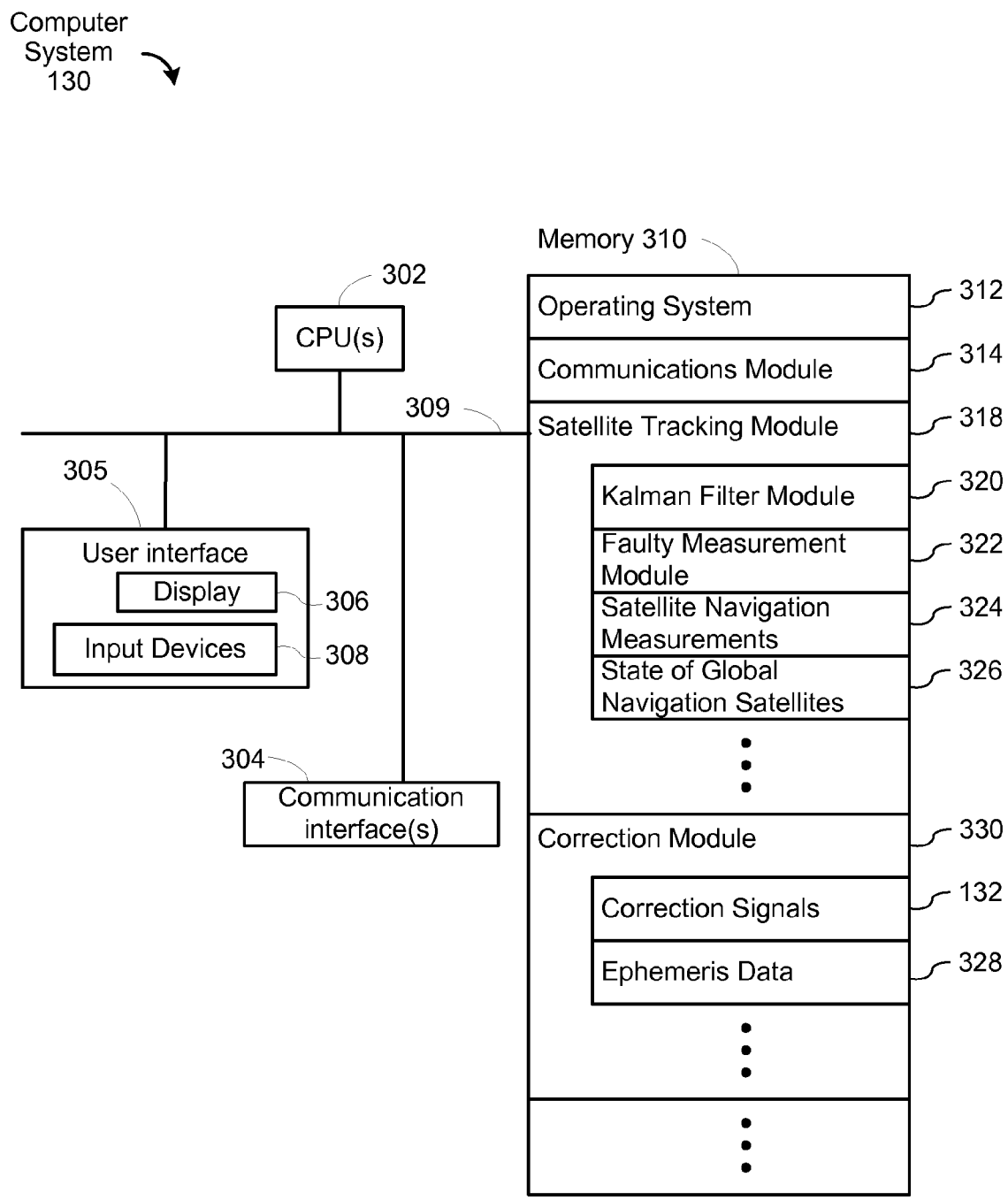
FIG. 3A is a block diagram illustrating a computer system, according to some embodiments.

FIG. 3A is a block diagram illustrating computer system 130, according to some embodiments. Computer system 130 typically includes one or more processing units (CPU's) 302, one or more network or other communications interfaces 304, memory 310, and one or more communication buses 309 for interconnecting these components. The communication buses 309 may include circuitry (sometimes called a chipset) that interconnects and controls communications between system components. Computer system 130 optionally may include a user interface 305 comprising a display device 306 and one or more input devices 308 (e.g., one or more of a keyboard, mouse, touch screen, keypad, etc.). Memory 310 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 310 may optionally include one or more storage devices remotely located from the CPU(s) 302. Memory 310, or alternately the non-volatile memory device(s) within memory 310, comprises a non-transitory computer readable storage medium. In some embodiments, memory 310 or the computer readable storage medium of memory 310 stores the following programs, modules and data structures, or a subset thereof:

- an operating system 312 that includes procedures for handling various basic system services and for performing hardware dependent tasks;
- a communication module 314 that is used for connecting computer system 130 to other computer systems via the one or more communication interfaces 304 (wired or wireless) and one or more communication networks (e.g., the network 150 of FIG. 1A), such as the Internet, other wide area networks, local area networks, metropolitan area networks, or a combination of such networks;
- a satellite tracking module 318 that receives and processes signals from global navigation satellites 110-1 to 110-N via reference stations 140-1 to 140-M, the satellite tracking module 318 including a Kalman filter module 320 configured to estimate a state 326 of global navigation satellites 110-1 to 110-N based on satellite navigation measurements 324 obtained from a set of reference stations 140 (FIG. 1A), and a faulty measurement module 322 that detects and compensates for faulty measurements (as described in more detail below with respect to FIGS. 12-19);
- ephemeris data 328, which includes a set of parameters used by computer system 130 to predict orbits and clocks of the global navigation satellites; and
- a correction module 330 that uses the state 326 of the global navigation satellites 110-1 to 110-N to generate the correction signals 132 that correct for orbital deviations (i.e., errors in the predicted orbits and clocks) of the global navigation satellites 110-1 to 110-N relative to the predicted orbits and clocks broadcast from the satellites.

As noted in the description of the satellite navigation receiver 120 (FIG. 2), the satellite navigation measurements 324 obtained from a set of reference stations 140 are based on signals received by the reference stations from the global navigation satellites 110-1 to 110-N. Also as noted above, the correction signals 132 generated by the correction module may include corrections that compensate for additional sources of navigation signal errors, in addition to errors in the predicted orbits and clocks of the global navigation satellites 110, such as tropospheric effects and ionospheric effects, satellite wide lane and narrow lane fractional phase biases, and/or inter-frequency biases in the code and carrier phase measurements.

Each of the above identified elements may be stored in one or more of the previously mentioned memory devices, and corresponds to a set of instructions for performing a function described above. The set of instructions can be executed by one or more processors (e.g., the CPUs 302). The above identified modules or programs (i.e., sets of instructions) need not be implemented as separate software programs, procedures or modules, thus various subsets of these modules may be combined or otherwise re-arranged in various embodiments. In some embodiments, memory 310 may store a subset of the modules and data structures identified above. Furthermore, memory 310 may store additional modules and data structures not described above.

Although FIG. 3A shows a "computer system," FIG. 3A is intended more as functional description of the various features which may be present in a set of computer systems than as a structural schematic of the embodiments described herein. In practice, and as recognized by those of ordinary skill in the art, items shown separately could be combined and some items could be separated. For example, some items shown separately in FIG. 3A could be implemented on single computer systems and single items could be implemented by one or more computer systems. The actual number of computer systems and how features are allocated among them will vary from one implementation to another, and may depend in part on the amount of data traffic that the system must handle during peak usage periods as well as during average usage periods.

Figure 3B:
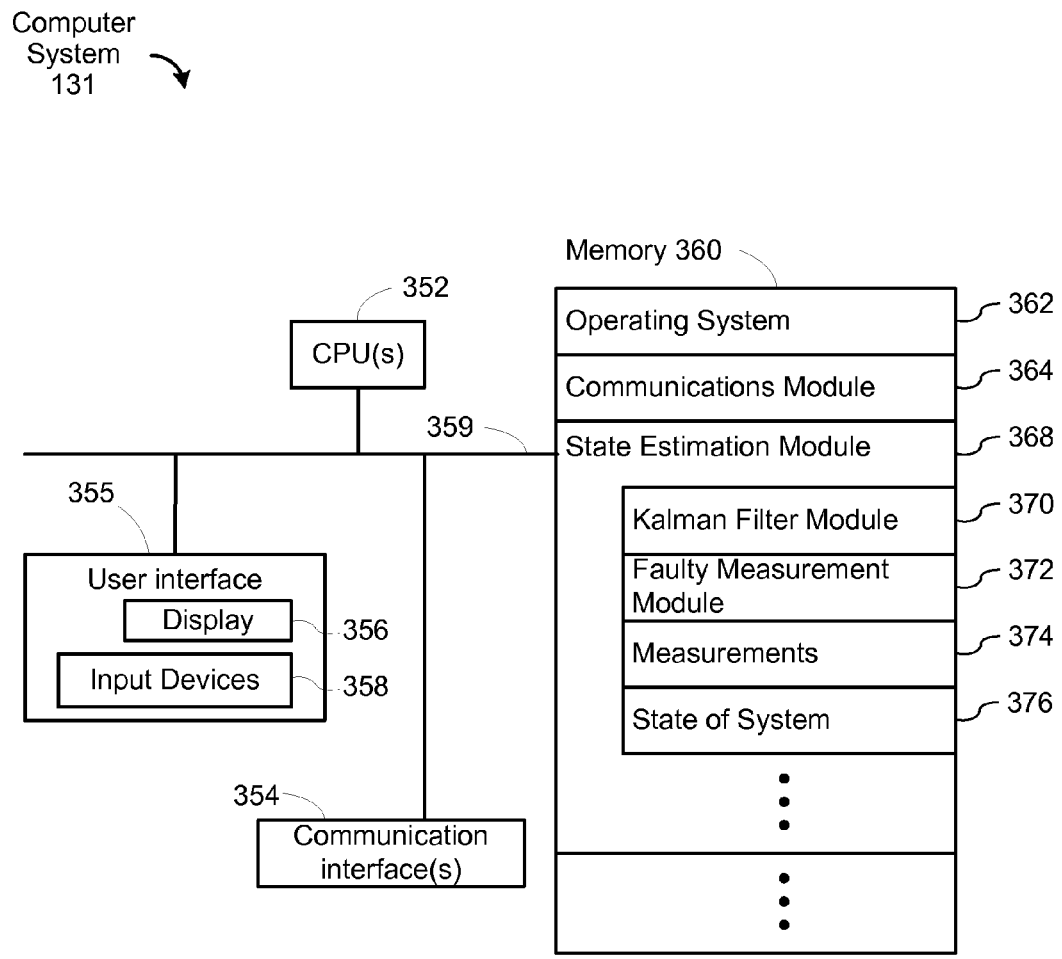
FIG. 3B is a block diagram illustrating a computer system, according to some embodiments.

FIG. 3B is a block diagram illustrating the computer system 131, according to some embodiments. The computer system 131 typically includes one or more processing units (CPU's) 352, one or more network or other communications interfaces 354, memory 360, and one or more communication buses 359 for interconnecting these components. The communication buses 359 may include circuitry (sometimes called a chipset) that interconnects and controls communications between system components. The computer system 131 optionally may include a user interface 355 comprising a display device 356 and one or more input devices 358 (e.g., one or more of a keyboard, mouse, touch screen, keypad, etc.). Memory 360 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 360 may optionally include one or more storage devices remotely located from the CPU(s) 352. Memory 360, or alternately the non-volatile memory device(s) within memory 360, comprises a non-transitory computer readable storage medium. In some embodiments, memory 360 or the computer readable storage medium of memory 360 stores the following programs, modules and data structures, or a subset thereof:

- an operating system 362 that includes procedures for handling various basic system services and for performing hardware dependent tasks;
- a communication module 364 that is used for connecting the computer system 131 to other computer systems via the one or more communication interfaces 354 (wired or wireless) and one or more communication networks (e.g., the network 150 of FIG. 1B), such as the Internet, other wide area networks, local area networks, metropolitan area networks, or a combination of such networks; and
- a state estimation module 368 that receives and processes signals from the sensors 174-1 to 174M, the satellite tracking module 368 including a Kalman filter module 370 configured to estimate a state 376 of system 172 (FIG. 1B) based on the measurements 374 received from the sensors 174-1 to 174-M, and a faulty measurement module 372 that detects and compensates for faulty measurements (as described in more detail below with respect to FIGS. 12-19).

Each of the above identified elements may be stored in one or more of the previously mentioned memory devices, and corresponds to a set of instructions for performing a function described above. The set of instructions can be executed by one or more processors (e.g., the CPUs 352). The above identified modules or programs (i.e., sets of instructions) need not be implemented as separate software programs, procedures or modules, and thus various subsets of these modules may be combined or otherwise re-arranged in various embodiments. In some embodiments, memory 360 may store a subset of the modules and data structures identified above. Furthermore, memory 360 may store additional modules and data structures not described above.

Although FIG. 3B shows a "computer system," FIG. 3B is intended more as functional description of the various features which may be present in a set of computer systems than as a structural schematic of the embodiments described herein. In practice, and as recognized by those of ordinary skill in the art, items shown separately could be combined and some items could be separated. For example, some items shown separately in FIG. 3B could be implemented on single computer systems and single items could be implemented by one or more computer systems. The actual number of computer systems and how features are allocated among them will vary from one implementation to another, and may depend in part on the amount of data traffic that the system must handle during peak usage periods as well as during average usage periods.

Standard Kalman Filter Estimation

Before proceeding with the discussion on compensating for faulty measurements, it is instructive to discuss a standard Kalman filter implementation. Note that a Kalman filter, as used in this specification, includes standard Kalman filters, as well as extended and modified Kalman filters. The embodiments described herein can be applied to any of these types of Kalman filters. Kalman filters have two phases of computation for each measurement epoch: a prediction phase and an update phase. In addition, a Kalman filter generally predicts and updates both an estimated state of the device or system being tracked by the Kalman filter, and a predicted estimate covariance (often simply called the covariance or estimate covariance), representing the estimated accuracy of the computed state.

The Kalman filter is typically a procedure (or module), or set of procedures (or modules), executed by one or more processors. The Kalman filter is executed repeatedly (e.g., once per second), each time using new code measurements (also called pseudorange measurements) and carrier phase measurements, to update the Kalman filter state. While the equations used by Kalman filters are complex, Kalman filters are widely used in the field of navigation, and therefore only those aspects of the Kalman filters that are relevant to the present invention need to be discussed in any detail. It should be emphasized that while Kalman filters are widely used in GPS receivers and other navigation systems, many aspects of those Kalman filters will vary from one implementation to another. For instance, the Kalman filters used in some GPS receivers may include states that are not included in other Kalman filters, or may use somewhat different equations than those used in other Kalman filters.

Let sets of satellite navigation measurements taken in time sequence be denoted as $L_1, L_2, \ldots, L_n$, where the subscript denotes the time at which the satellite navigation measurement is taken and where each satellite navigation measurement set is defined as a measurement vector. The unknown state vectors at each measurement epoch are denoted as $X_1, X_2, \ldots, X_n$, respectively.

The relationship between the expected value of the satellite navigation measurements as a function of the unknown state parameters can be described as $E(L_k)=F(X_k)$. The difference between the satellite navigation measurements and their expected value, sometimes referred to as the pre-fix residuals, is designated as Z. The linear observational model whose norm is to be minimized is given by:

$$V_k = H\delta X_k^+ - (L_k - f(X_k^-)) = H\delta X_k^+ - Z \tag{1}$$

where $V_k$ is the residual vector (i.e., post measurement update), $X_k^-$ is the state vector parameters before the measurement update, H is the sensitivity of the satellite navigation measurements to the unknown state parameters (partial derivatives of $f(X_k^-)$ with respect to the state vector parameters), $\delta X_k^+$ is the correction to the state vector which minimizes the norm of the residual vector.

In standard Kalman filter processing the satellite navigation measurements are assumed to have a noise, $\epsilon$, that is uncorrelated between measurement epochs. In addition, the individual satellite navigation measurements at a specific measurement epoch also are assumed to be uncorrelated. Note that when the satellite navigation measurements are correlated, it is often possible to remove the correlation in a preprocessing step. The covariance matrix for a given measurement epoch is defined by the diagonal matrix R:

$$\text{Cov}(\varepsilon_i, \varepsilon_j) = R = \begin{cases} r_i & i = j \\ 0 & i \neq j \end{cases} \tag{2}$$

where $r_i$ is the $i^{th}$ diagonal element of the covariance matrix R, representing the covariance of the $i^{th}$ satellite navigation measurement.

In some forms of the Kalman filter implementation, the inverse of the R matrix is used instead of R. The inverse of R is also referred to as the weight matrix W in which the elements $w_i$ of W are simply the inverse of the individual elements of R (i.e., $w_i=1/r_i$).

The relationship between sequential epoch's of the vector $X_1, X_2, \ldots, X_n$ is established statistically as:

$$X_k = \phi_{k,k-1} X_{k-1} + U_k \tag{3}$$

where $X_k$ is the unknown state vector at epoch k, $\phi_{k,k-1}$ is a matrix (also called the transition matrix) that relates $X_{k-1}$ to $X_k$, and $U_k$ is a vector whose elements are a white noise sequence (i.e., a sequence of zero mean random values that are uncorrelated).

The covariance matrix associated with $U_k$ is assumed to be known and is denoted as:

$$Q_k = \text{Cov}[U_k U_j^T] = \begin{cases} Q_k & j = k \\ 0 & j \neq k \end{cases} \tag{4}$$

where $U_j^T$ is the transpose of $U_j$, which is the same as the non-transpose of $U_j$ because $U_j$ is a diagonal matrix.

The Kalman filter estimate of the state after k−1 epochs is $X_{k-1}^+$ with a corresponding covariance of $P_{k-1}^+$. The predicted state and corresponding covariance matrix at the next epoch, k, is:

$$X_k^- = \phi_{k,k-1} X_{k-1}^+ \tag{5}$$

$$P_k^- = \phi_{k,k-1} P_{k-1}^+ \phi_{k,k-1}^T + Q_k \tag{6}$$

where: $X_{k-1}^+$ and $P_{k-1}^+$ are Kalman filter estimated states and variance, respectively, for the k−1 epoch, $\phi_{k,k-1}$ and $Q_k$ are Kalman filter state transition and dynamic matrices, respectively, between k−1 and k epochs, and $X_k^-$ and $P_k^-$ are Kalman filter predicted states and variance, respectively, for epoch k. The Kalman filter estimated state and variance are sometimes called the state and variance (or the calculated state and variance) of the object or system whose state is being tracked by the Kalman filter.

In order to update the results using the measurement vector at epoch k (the observation equation) the following formulas are used. The Kalman gain matrix, K, is $$K = P_k^- H^T (H P_k^- H^T + R)^{-1} \tag{7}$$

The state (parameter) vector measurement update, $X_k^+$, also called the Kalman filter estimated state or the computed state of the object or system, is $$X_k^+ = X_k^- + KZ \tag{8}$$

The covariance matrix measurement update, $P_k^+$, also called the Kalman filter estimated covariance or the computed covariance of the object or system, is $$P_k^+ = (I - KH) P_k^- \tag{9}$$

where I is the identity matrix.

When the measurements at a measurement epoch are uncorrelated and processed one at a time, equations (7) through (9) can be written for processing the $j^{th}$ measurement as follows. The Kalman gain (now a column vector) which involved an inverse in the matrix form of equation (7) is now accomplished with a simple divide for a single measurement $$k_j = (P_k^{j-1} h_j^T)_j / (h_j P_k^{j-1} h_j^T + r_j) \tag{10}$$

where $k_j$ is the $j^{th}$ column (vector) of gains and includes one element for each state parameter of the state, $P_k^{j-1}$ is the covariance matrix which is computed at the measurement update with the $(j-1)^{th}$ measurement, $h_j$ is the $j^{th}$ column (vector) from the sensitivity matrix H, and $r_j$ is the $j^{th}$ diagonal element of the measurement covariance matrix, R. The state vector measurement update is:

$$X_k^j = X_k^{j-1} + k_j z_j \tag{11}$$

where $z_j$ is the $j^{th}$ element of the prefix residuals Z, $k_j$ is the Kalman gain column vector computed in equation (10), and the superscripts (j and j−1) on X now indicate the update from the (j−1)$^{th}$ to the j$^{th}$ measurement. The covariance matrix measurement update is:

$$P_k^j = (I - k_j h_j) P_k^{j-1} \qquad (12)$$

where the j superscript of the covariance matrix $P_k$ indicates the covariance matrix $P_k$ (which includes the effects of the (j−1)$^{th}$ measurement) has been updated by the j$^{th}$ measurement, $k_j$ is the column vector computed in equation (10), $h_j$ is the j$^{th}$ column (vector) of the sensitivity matrix H, and I is the identity matrix.

Note that the same final result is obtained independent of the order in which the individual measurements are incorporated into the state vector and its associated covariance matrix. The ability to process the satellite navigation measurements in any order is only possible when there is no correlation between the measurements.

Removing a Faulty Measurement from a Set of Measurements

In order to enable the removal of a faulty measurement from the Kalman filter implementation, the Kalman filter implementation is reformulated in terms of an equivalent weighted least squares (WLS) implementation using a WLS measurement update. The faulty measurement is then removed from the WLS implementation. In the WLS implementation, the inverse of the state covariance matrix and the inverse of the measurement covariance matrix are used. As discussed above, since the satellite navigation measurements are independent, the measurement covariance matrix, R, is a diagonal matrix. Therefore, the inverse of R, which is referred to as the weight matrix W, is also a diagonal matrix in which the diagonal elements are the inverse of the individual diagonal elements of covariance matrix R. The covariance matrix of the state vector (i.e., the P matrix), has an inverse that is often referred to as the information matrix M.

Using the above nomenclature, the measurement update takes the following form for the WLS implementation. The information matrix M is first updated using Equation (13)

$$M_k^+ = H^T W H + M_k^- \qquad (13)$$

where the superscript "plus" in $M_k^-$ denotes the information matrix after being updated by a new measurement and the superscript "minus" in $M_k^-$ denotes the information matrix prior to being updated by the new measurement.

The state vector is then updated:

$$X_k^+ = X_k^- + (M_k^+)^{-1} H^T W Z \qquad (14)$$

where the superscript "plus in $X_k^+$ denotes the state matrix after being updated by a new measurement and the superscript "minus" in $X_k^-$ indicates the state matrix prior to being updated by a new measurement.

Using a "minus one" exponent to denote a matrix inversion (e.g., $A^{-1}$), equations (13) and (14) may be written in terms of the Kalman filter implementation as:

$$(P_k^+)^{-1} = H^T R^{-1} H + (P_k^-)^{-1} \qquad (15)$$

$$X_k^+ = X_k^- + P_k^+ H^T R^{-1} Z \qquad (16)$$

It can be shown using standard matrix manipulation rules that equations (15) and (16) are equivalent to equations (7)-(9) above.

Using the nomenclature developed above for including single measurements (i.e., equations (10)-(12)), equations (13) and (14) can be written in the following form assuming there are m measurements available at the epoch k:

$$M_k^+ = \sum_{j=1}^{m} h_j^T w_j h_j + M_k^- \qquad (17)$$

$$X_k^+ = X_k^- + (M_k^+)^{-1} \sum_{j=1}^{m} h_j^T w_j z_j \qquad (18)$$

where $h_j$ is the j$^{th}$ column (vector) of the sensitivity matrix H, $w_j$ is the j$^{th}$ diagonal element of W (i.e., the inverse of the j$^{th}$ diagonal element of R), and $z_j$ is the j$^{th}$ element of Z.

Equations (17) and (18) can be rewritten to include only the j$^{th}$ measurement (as indicated by the "j" superscripts and subscripts):

$$M_k^j = H_j^T w_j h_j + M_k^{j-1} \qquad (19)$$

$$X_k^j = X_k^{j-1} + (M_k^j)^{-1} h_j^T w_j z_j \qquad (20)$$

From equations (19) and (20), it is apparent that to remove a faulty measurement which has been previously included, the sign on the faulty measurement is changed and then the update defined by equations (19) and (20) is performed. For example, the faulty measurement can be removed by simply changing the sign of the associated weight matrix element, as shown in Equations (21) and (22). Note that in order to remove the faulty measurement, the faulty measurement must first be removed from the state vector, as accomplished by Equation (21), before the faulty measurement can be removed from the information matrix, as accomplished by Equation (22).

$$X_k^{j-1} = X_k^j + (M_k^j)^{-1} h_j^T (-w_j) z_j \qquad (21)$$

$$M_k^{j-1} = h_j^T (-w_j) h_j + M_k^j \qquad (22)$$

Converting Equations (21) and (22) back into a Kalman filter form yields:

$$X_k^{j-1} = X_k^j + P_k^j h_j T(1/-r_j) z_j \qquad (23)$$

$$(P_k^{j-1})^{-1} = h_j^T (1/-r_j) h_j + (P_k^j)^{-1} \qquad (24)$$

Using standard matrix manipulation, equations (23) and (24) can be rewritten in the form of equations (10), (11), and (12). When this is done, only equation (10) for the gain is affected. Equations (11) and (12) are not affected. Equation (10) becomes:

$$k_j = (P_k^{j-1} h_j^T) / (h_j P_k^{j-1} h_j^T - r_j) \qquad (25)$$

Thus, the effect of a faulty measurement on the state vector and the covariance matrix in a Kalman filter can be removed, after all the measurements for the specific epoch have been included, by reprocessing the faulty measurement with the measurement variance set to the negative of its original value. More specifically, taking the state of the Kalman filter $X_k^+$ that results from applying the measurements of the current epoch, including the faulty measurement, the effect of the faulty measurement is removed by first computing Equation (25), which has a negative sign for $r_j$ instead of a plus sign for $r_j$ as in Equation (10), then adjusting the state using Equation (11) and the covariance using Equation (12). The result of these computations is the removal of the faulty measurement.

Note that the aforementioned process may be repeated for each faulty measurement to remove each faulty measurement from the state and covariance matrices.

Applying a Different Weight to a Measurement

In some instances, satellite navigation measurements have post-fix residuals that indicate a problem with those measurements, but do not exceed a predefined threshold at which the measurements are to be excluded. For example, in the satellite orbit determination problem, a particular reference station may be subject to more multipath errors than other reference stations. If this is the case, it may be desirable, on the basis of the root mean square post-fix residuals, to reduce the measurement weighting for that reference station for least squares processing or to increase the measurement noise variance for that reference station for Kalman filter processing.

A brute force technique for accomplishing this task is to first remove the measurement, and then add it back in with the desired weighting or noise variance. However, the two steps would require the processing of the measurement twice: once to remove the measurement and once to add the measurement back in with the desired weighting or noise variance. It is possible to combine the two steps into one, using a partial removal of the measurement. Using the same logic as discussed above to remove the full measurement, a reduced weighting of the measurement can be achieved as follows. Assume that the new measurement is to be reduced from w to a fraction f of w (i.e., fw). The weighting is achieved by processing the measurement by applying the following weight to the measurement $$-(1-f)w \qquad (26)$$

The equivalent measurement noise variance to assign for reprocessing the measurement in the Kalman filter is the inverse of the weight $$-\frac{r}{1-f} \qquad (27)$$

Using this technique, measurements can be assigned a new noise variance in a single reprocessing step. In some embodiments, a two-fold threshold is used in which a first threshold is used to determine when to remove faulty measurements from the state and covariance matrices and a second threshold is used to determine whether to reduce the weighting of the faulty measurement as applied to the state and covariance matrices. This is explained in more detail below.

Detecting Faulty Measurements

In some embodiments, the presence of a faulty measurement in a plurality of satellite navigation measurements is detected at a given level of confidence by performing a chi-squared test. Faulty measurements or sets of faulty measurements are sometimes detected via a ratio test where the individual post-fix residuals or sets of post-fix residuals are divided by the root mean square (rms) of the residuals obtained from the entire set of measurements for the epoch. When that ratio exceeds a predefined threshold, for example a threshold in the range of 3 to 5, the measurement is declared faulty. Typically, an iterative process is used to detect (or check for) multiple outliers. In some embodiments, each iteration of the process detects at most one outlier (e.g., the worst remaining outlier, if any), which has the largest ratio value (e.g., of the post-fix residual to the root mean square of the residuals, as defined above). After an outlier (also called a fault measurement) is identified in a respective iteration, the faulty measurement is removed using negative variance or by applying a different weight to the faulty measurement. The post-fit residuals are recomputed with the faulty measurement removed, or given a lesser weight, and the recomputed post-fit residuals are then used to detect (or check for) another outlier in a next iteration. This process is typically repeated until the largest ratio of any individual post-fix residual to the root mean square residual does not exceed the pre-defined threshold.

In some embodiments, after a measurement is determined to be faulty, the faulty measurement is tested to determine whether the bias of the faulty measurement exceeds one or more specified thresholds.

In some embodiments, after all the detected potential outliers have been removed from the Kalman filter states and variance estimation, the magnitude of the outlier bias can be derived for each measurement j using equation (28)

$$b_j = z_j - H_j \delta X_k^+ \qquad (28)$$

where $b_j$ is magnitude of the code or phase outlier bias for the $j^{th}$ measurement, $H_j$ is the $j^{th}$ column of the sensitivity matrix H, and $\delta X_k^+$ is defined above. Applying error propagation law and assuming there is no correlation between the outlier and the estimated Kalman filter states, the associated variance is calculated using equation (29)

$$R_{b_j} = r_j + H_j P_k^+ H_j^T \qquad (29)$$

where $R_{b_j}$ is the variance for the bias $b_j$ and $r_j$ is defined above.

Figure 20:
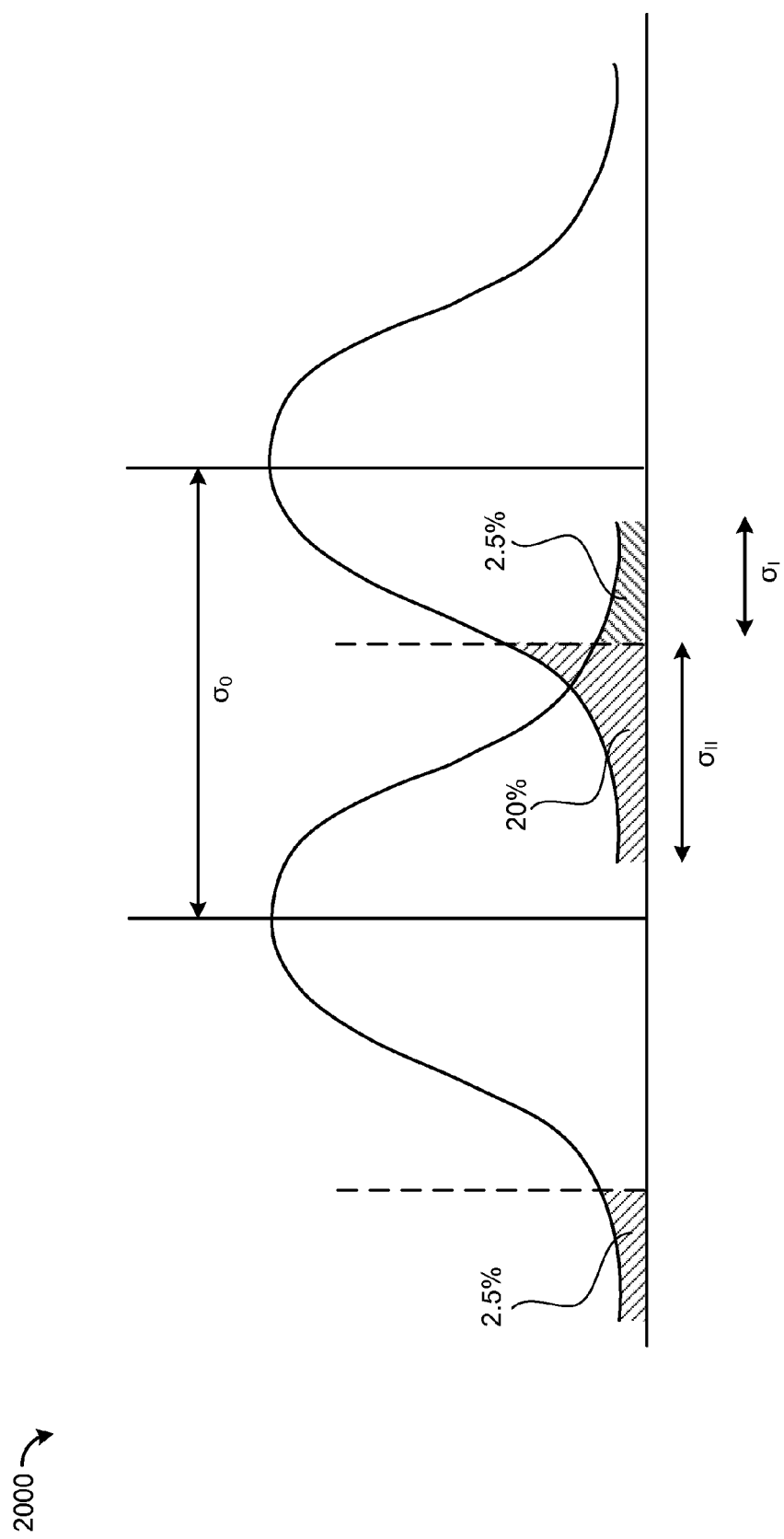
FIG. 20 is a graph illustrating a non-centrality parameter used in the calculation of a minimum detectable error, according to some embodiments.

A measure of internal reliability is quantified as the Minimal Detectable Error (MDE) and is the lower bound for detectable outliers. The MDE is the magnitude of the smallest error that can be detected for a specific level of confidence and power of the test. In some embodiments, the MDE is calculated using equation (30):

$$MDE = \sqrt{R_{b_j} \sigma_0} \qquad (30)$$

where $\sigma_0 = \sigma_I + \sigma_{II}$ is the non-centrality parameter, which depends on the given Type I ($\sigma_I$) and Type II ($\sigma_{II}$) errors, illustrated in FIG. 20. Typically, the power of the test is held at a predetermined value (e.g., 80%) and a predetermined confidence level (e.g., 95-99%) for the determination of the MDE.

In some embodiments, a significance test is performed on the outlier bias $b_j$ based on the MDE threshold to confirm whether the $j^{th}$ measurement is or is not an outlier. In some embodiments, if the code bias $b_j$ exceeds the MDE threshold, the bias, variance, and MDE are reported and the faulty $j^{th}$ measurement is removed from the state and covariance matrices as described above. In some embodiments, if the code bias does not exceed the MDE threshold, the faulty measurement is retained in the state and covariance matrices. Note that if a real bias does, in fact, exist, but does not exceed the MDE threshold, it is a case of a missed detection.

In some embodiments, if the phase bias $b_j$ exceeds the MDE threshold, the ambiguity state is reset using the new estimated $b_j$ and variance $R_{b_j}$. In some embodiments, if the phase bias does not exceed the MDE threshold, the measurement is retained and the ambiguity state is not reset. Note that if a real bias existed in the phase measurement, but does not exceed the MDE threshold, it is a case of a missed detection.

Determine a State for a Plurality of Global Navigation Satellites

The process described above with respect to equations (1) to (30) may be used to determine a state of a plurality of global navigation satellites (e.g., to track the orbits of the satellites), as described below with respect to FIGS. 4-11.

Figure 4:
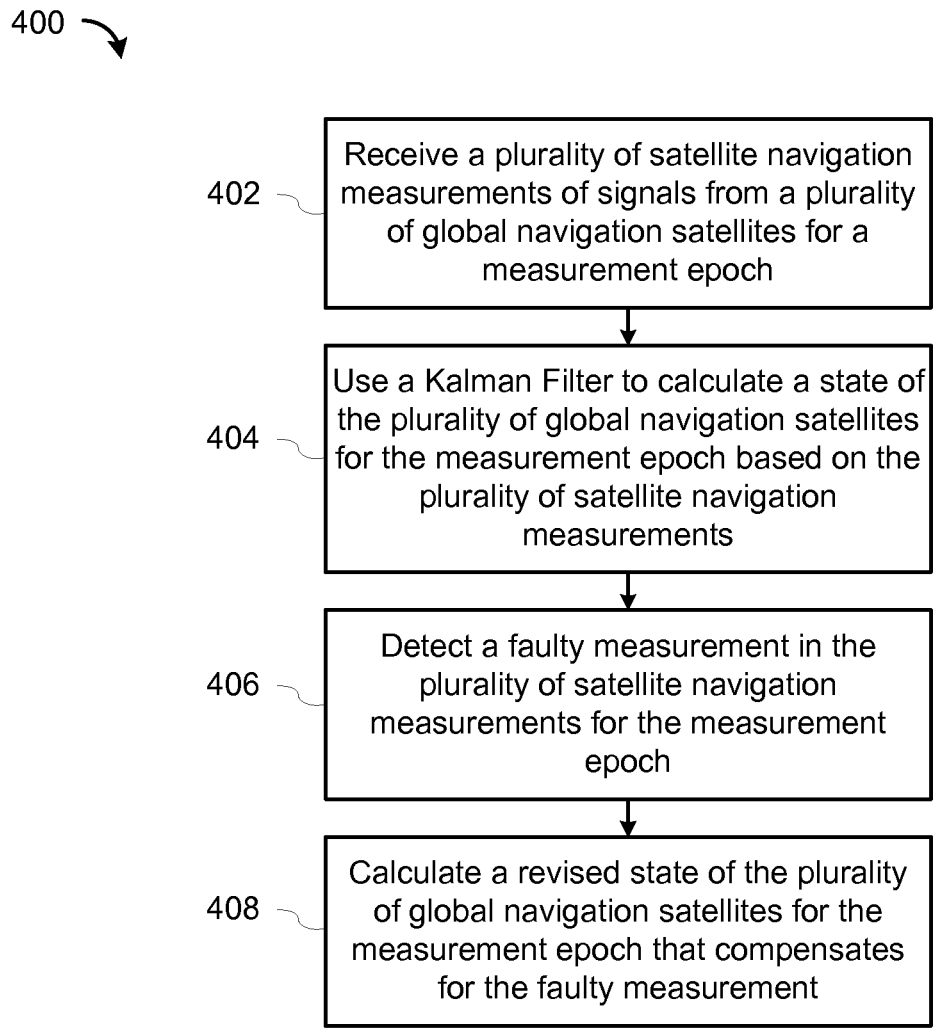
FIG. 4 is a flowchart of a method for compensating for a faulty satellite navigation measurement, according to some embodiments.

FIG. 4 is a flowchart of a method 400 for compensating for a faulty satellite navigation measurement, according to some embodiments. The satellite tracking module 318 receives (402) a plurality of satellite navigation measurements (e.g., the satellite navigation measurements 324) of signals from a plurality of global navigation satellites (e.g., the global navigation satellites 110-1 to 110-N) for a measurement epoch, wherein the plurality of satellite navigation measurements are received from a plurality of reference stations at known locations (e.g., the reference stations 140-1 to 140-M, FIG. 1A).

Kalman filter module 320 uses (404) a Kalman filter to calculate a state of the plurality of global navigation satellites (e.g., the state 326 of the global navigation satellites 110-1 to 110-N) for the measurement epoch based on the plurality of satellite navigation measurements. In some embodiments, the state of the plurality of global navigation satellites includes a position of each global navigation satellite in the plurality of global navigation satellites, a velocity of each global navigation satellite in the plurality of global navigation satellites, and a time reported by each global navigation satellite in the plurality of global navigation satellites. In some embodiments, the state of the plurality of global navigation satellites for the measurement epoch is calculated using a first closed form update equation (e.g., Equation (11)). Faulty measurement module 322 detects (406) a faulty measurement in the plurality of satellite navigation measurements for the measurement epoch. Note that step 406 is described in more detail below with respect to FIG. 5. Faulty measurement module 322 then calculates (408) a revised state of the plurality of global navigation satellites for the measurement epoch that compensates for the faulty measurement, using the calculated state of the plurality of global navigation satellites for the measurement epoch as an input to the revised state calculation, and using a revised closed-form update equation comprising the first closed-form update equation modified with respect to the faulty measurement (e.g., using Equations (11) and (25)). Note that step 408 is described in more detail below with respect to FIG. 6.

Figure 5:
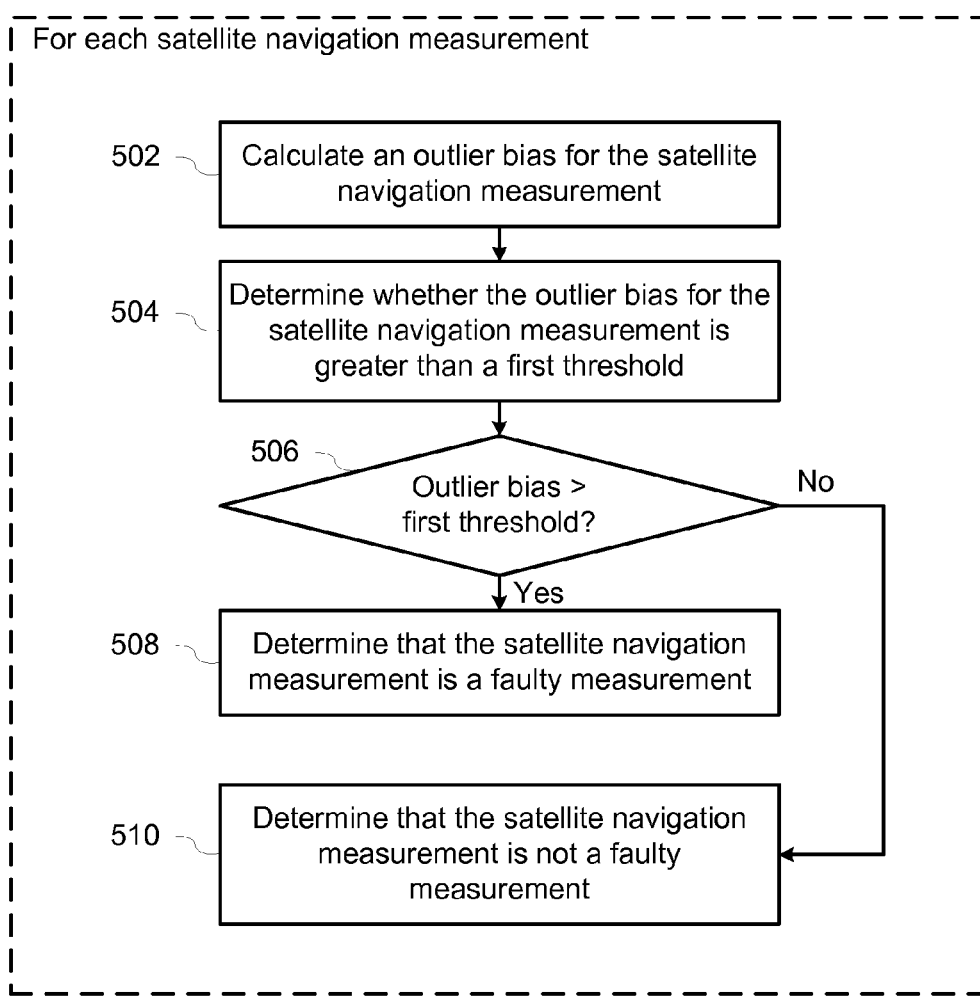
FIG. 5 is a flowchart of a method for detecting the faulty satellite navigation measurement, according to some embodiments.

FIG. 5 is a flowchart of a method for detecting (406, FIG. 4) a faulty satellite navigation measurement, according to some embodiments. For each satellite navigation measurement in the plurality of satellite navigation measurements, faulty measurement module 322 calculates (502) an outlier bias for the satellite navigation measurement and determines (504) whether the outlier bias for the satellite navigation measurement is greater than a first threshold. If the outlier bias for the satellite navigation measurement is greater than the first threshold (506, yes), faulty measurement module 322 determines (508) that the satellite navigation measurement is a faulty measurement. If the outlier bias is below the first threshold (506, no), faulty measurement module 322 determines (510) that the satellite navigation measurement is not a faulty measurement. This process is typically repeated for each and every one of the satellite navigation measurement that has been used in the Kalman filter to update the state of the object or system being tracked by the Kalman filter. Optionally, in some circumstances the faulty measurement detection process is performed on a subset (less than all) of the satellite navigation measurements received for a respective epoch. For example, if the number of faulty measurements for one epoch detected exceeds a predefined level, the remaining measurements may be assumed to be faulty as well, in which case the state may be revised so as to exclude the effect of all the measurements for that epoch.

Figure 6:
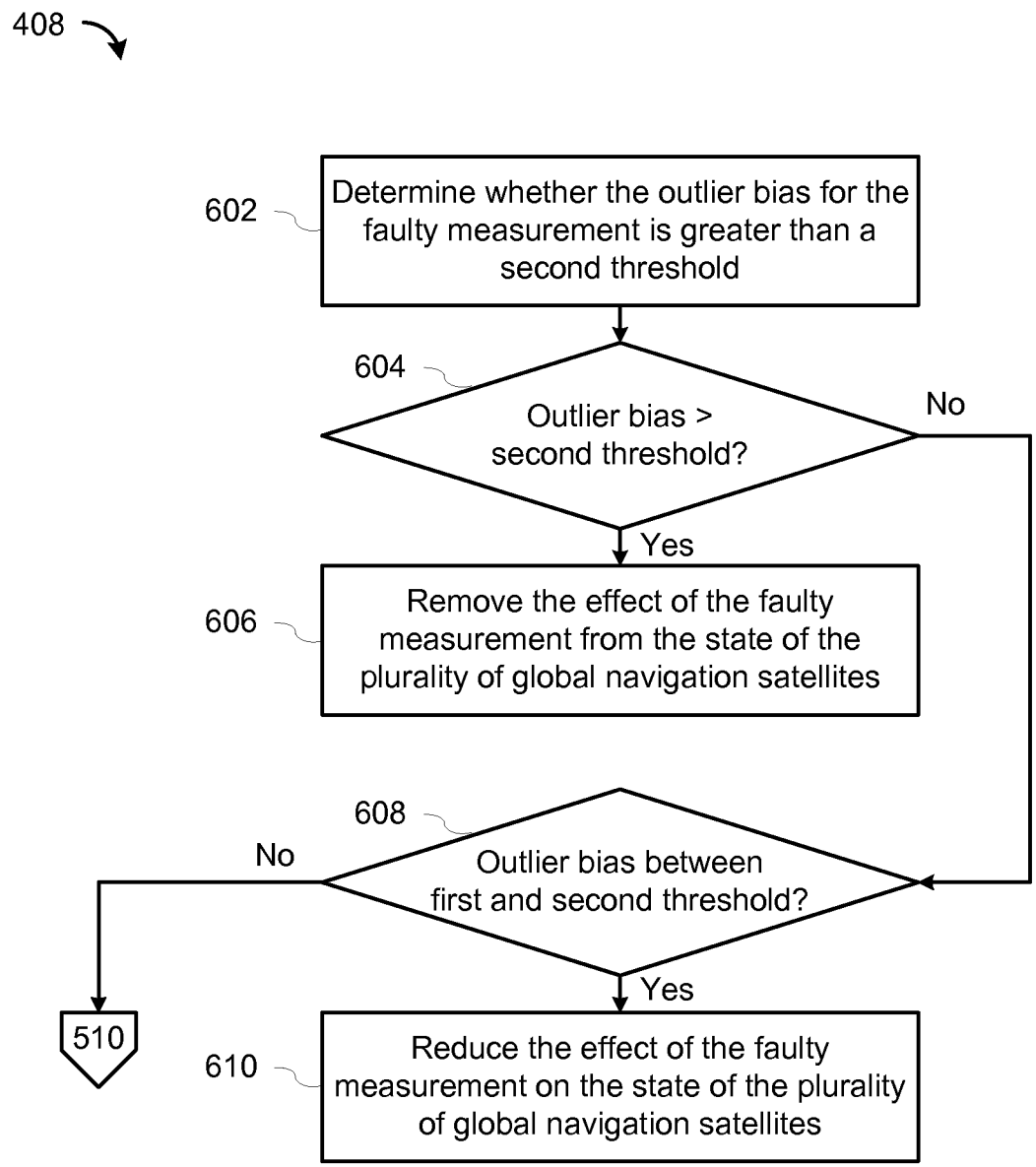
FIG. 6 is a flowchart of a method for calculating a revised state of a plurality of global navigation satellites for a measurement epoch that compensates for the faulty measurement, according to some embodiments.
Figure 7:
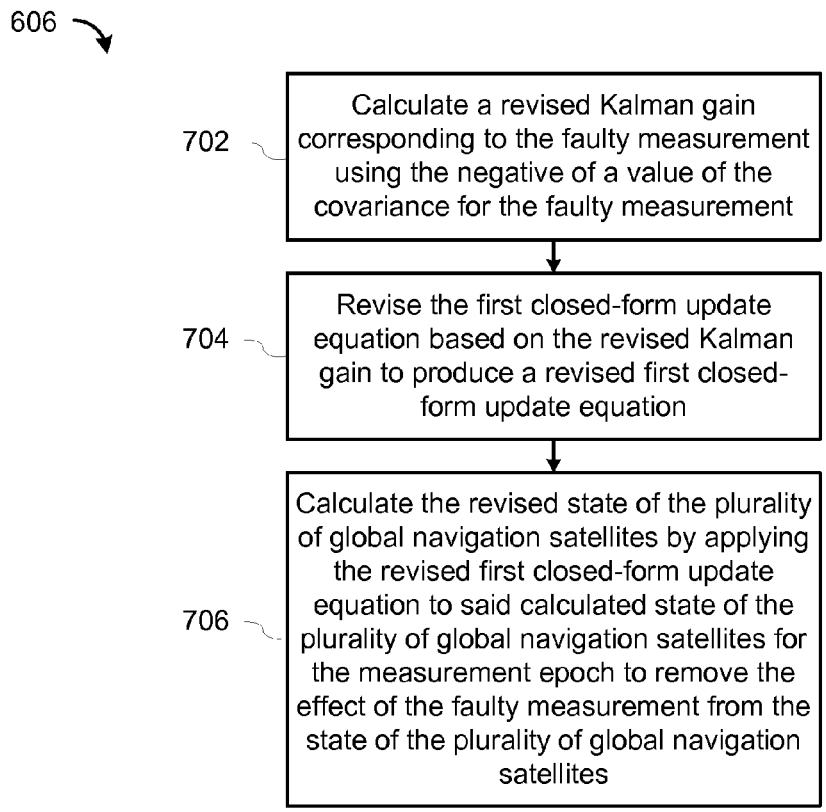
FIG. 7 is a flowchart of a method for removing the effect of the faulty measurement from the state of the plurality of global navigation satellites, according to some embodiments.

FIG. 6 is a flowchart of a method for calculating (408, FIG. 4) a revised state of a plurality of global navigation satellites for a measurement epoch that compensates for the faulty measurement, according to some embodiments. Faulty measurement module 322 determines (602) whether the outlier bias for the faulty measurement is above a second threshold, wherein the second threshold is greater than the first threshold. In some embodiments, the second threshold is the minimum detectable error threshold (e.g., as described with respect to Equation (30)).

If the outlier bias is greater than the second threshold (604, yes), faulty measurement module 322 removes (606) the effect of the faulty measurement from the state of the plurality of global navigation satellites. Step 606 is described in more detail with respect to FIG. 7, which is a flowchart of a method for removing (606) the effect of the faulty measurement from the state of the plurality of global navigation satellites, according to some embodiments. Faulty measurement module 322 calculates (702, FIG. 7) a revised Kalman gain corresponding to the faulty measurement using the negative of a value of a covariance for the faulty measurement (e.g., Equation (25)), where the covariance for the faulty measurement is determined from a covariance matrix corresponding to the calculated state of the plurality of global navigation satellites. Faulty measurement module 322 then revises (704) the first closed-form update equation (e.g., Equation (11)) based on the revised Kalman gain to produce a revised first closed-form update equation (e.g., Equations (11) and (25)). Faulty measurement module 322 calculates (706) the revised state of the plurality of global navigation satellites by applying the revised first closed-form update equation to the calculated state of the plurality of global navigation satellites for the measurement epoch to remove the effect of the faulty measurement from the state of the plurality of global navigation satellites.

Figure 8:
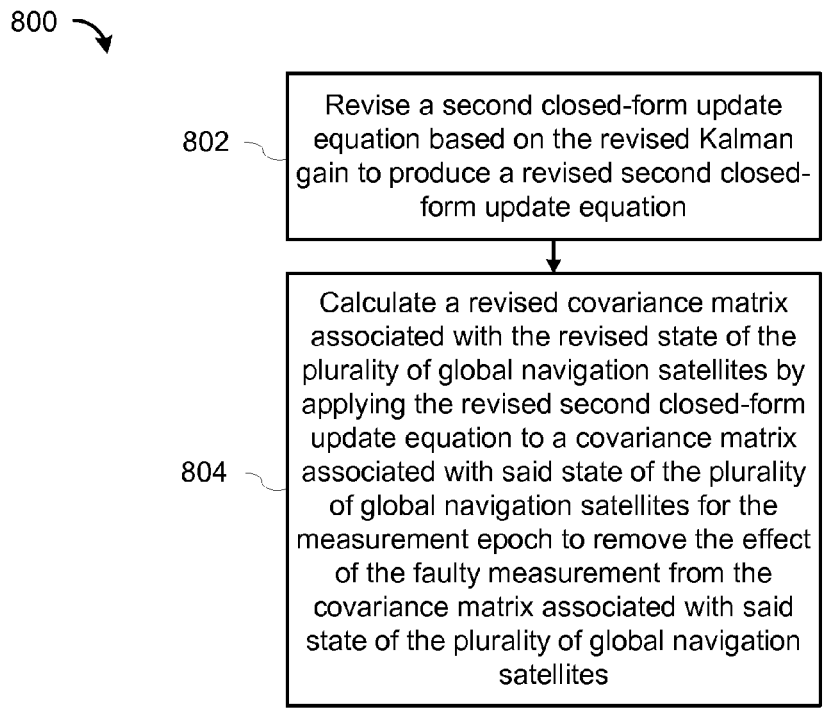
FIG. 8 is a flowchart of a method for calculating a revised covariance matrix associated with a revised state of the plurality of global navigation satellites, according to some embodiments.
Figure 9:
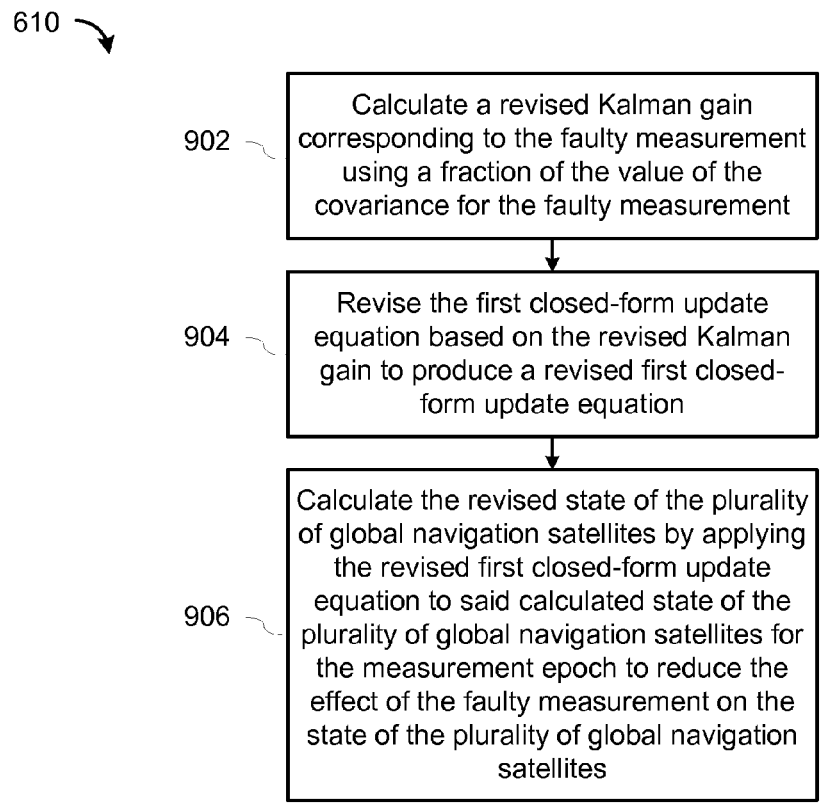
FIG. 9 is a flowchart of a method for reducing the effect of the faulty measurement on the state of the plurality of global navigation satellites, according to some embodiments.

After the revised state of the plurality of global navigation satellites for the measurement epoch has been calculated, a revised covariance matrix is calculated. FIG. 8 is a flowchart of a method 800 for calculating a revised covariance matrix associated with a revised state of the plurality of global navigation satellites, according to some embodiments. Faulty measurement module 322 revises (802) a second closed-form update equation (e.g., Equation (12)) based on the revised Kalman gain (e.g., Equation (25)) to produce a revised second closed-form update equation (e.g., Equations (12) and (25)). Faulty measurement module 322 then calculates (804) a revised covariance matrix associated with the revised state of the plurality of global navigation satellites by applying the revised second closed-form update equation to a covariance matrix associated with the state of the plurality of global navigation satellites for the measurement epoch to remove the effect of the faulty measurement from the covariance matrix associated with the state of the plurality of global navigation satellites.

Returning to FIG. 6, if the outlier bias is between the first threshold and the second threshold (604, no and 608, yes), faulty measurement module 322 reduces (610) the effect of the faulty measurement on the state of the plurality of global navigation satellites. Step 610 is described in more detail with respect to FIG. 9, which is a flowchart of a method for reducing the effect of the faulty measurement on the state of the plurality of global navigation satellites, according to some embodiments. Faulty measurement module 322 calculates (902) a revised Kalman gain corresponding to the faulty measurement using a fraction of the value of the covariance for the faulty measurement (e.g., Equations (25) and (27)). Faulty measurement module 322 then revises (904) the first closed-form update equation based on the revised Kalman gain to produce a revised first closed-form update equation (e.g., Equations (11), (25), and (27)). Faulty measurement module 322 calculates (906) the revised state of the plurality of global navigation satellites by applying the revised first closed-form update equation to the calculated state of the plurality of global navigation satellites for the measurement epoch to reduce the effect of the faulty measurement on the state of the plurality of global navigation satellites.

Figure 10:
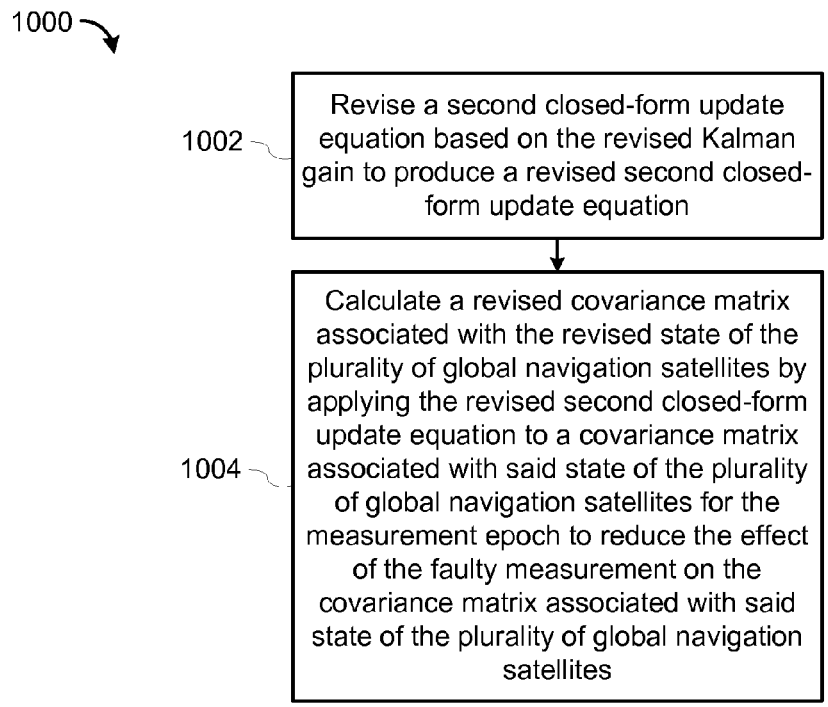
FIG. 10 is a flowchart of a method for calculating a revised covariance matrix associated with a revised state of the plurality of global navigation satellites, according to some embodiments.

After the revised state of the plurality of global navigation satellites for the measurement epoch has been calculated, a revised covariance matrix is calculated. FIG. 10 is a flowchart of a method 1000 for calculating a revised covariance matrix associated with a revised state of the plurality of global navigation satellites, according to some embodiments. Faulty measurement module 322 revises (1002) a second closed-form update equation (e.g., Equation (12)) based on the revised Kalman gain (e.g., Equations (25) and (27)) to produce a revised second closed-form update equation (e.g., Equations (12), (25), and (27)). Faulty measurement module 322 then calculates (1004) a revised covariance matrix associated with the revised state of the plurality of global navigation satellites by applying the revised second closed-form update equation to a covariance matrix associated with the state of the plurality of global navigation satellites for the measurement epoch to reduce the effect of the faulty measurement on the covariance matrix associated with the state of the plurality of global navigation satellites.

Returning to FIG. 6, if the outlier bias is below the first threshold (608, no), the process returns to step 510 in FIG. 5.

Figure 11:
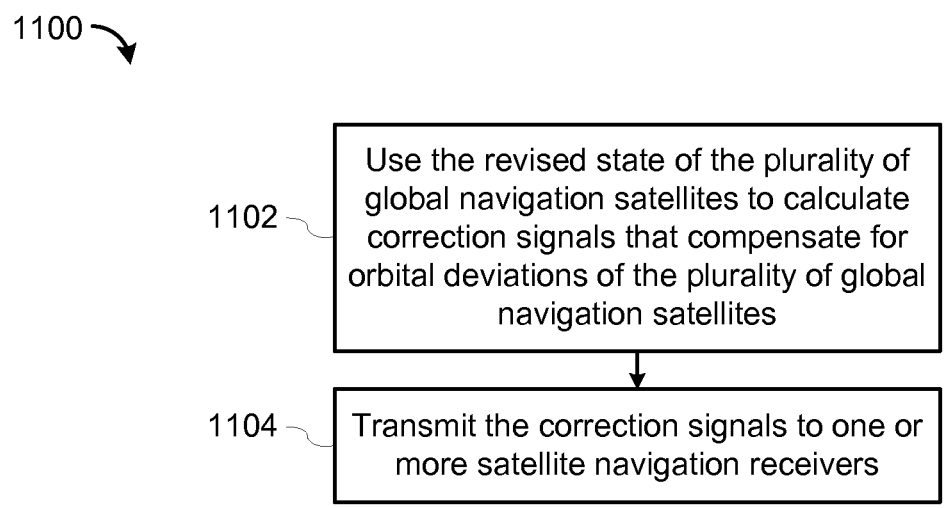
FIG. 11 is a flowchart of a method for transmitting correction signals to satellite navigation receivers, according to some embodiments.

In some embodiments, the revised state of the global navigation satellites is used to calculate correction signals (e.g., the correction signals 132) that correct for orbital deviations of the global navigation satellites 110-1 to 110-N. FIG. 11 is a flowchart of a method 1100 for transmitting correction signals to satellite navigation receivers, according to some embodiments. The correction module 330 uses (1102) the revised state of the plurality of global navigation satellites to calculate correction signals that compensate for orbital deviations of the plurality of global navigation satellites. As noted above, in some embodiments corrections for tropospheric effects and/or ionospheric effects are computed using techniques well known to those skilled in the art, and those corrections are included in the correction signals. The correction module 330 then transmits (1104) the correction signals to one or more satellite navigation receivers.

Determining a State of a Satellite Navigation Receiver

The process described above with respect to equations (1) to (30) may be used to determine a state of the satellite navigation receiver 120 (FIG. 1A) or, in general, a state of system 172 (FIG. 1B), as described below with respect to FIGS. 12-19. In some embodiments, the process described below may be performed by each of the reference stations 140-1 to 140-P. FIGS. 12-18 are described generally with respect to system 172 (FIG. 1B) and (in parentheses) with specific reference to the particular application of determining the state of the satellite navigation receiver 120.

Figure 12:
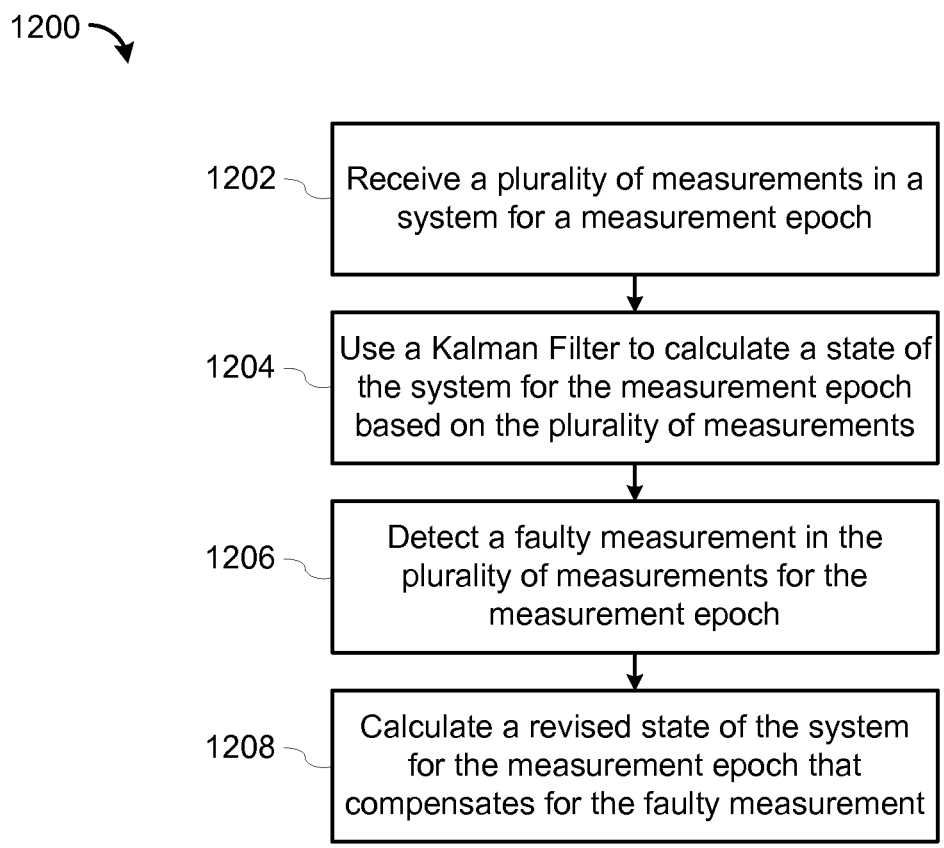
FIG. 12 is a flowchart of a method for compensating for a faulty measurement, according to some embodiments.

FIG. 12 is a flowchart of a method 1200 for compensating for a faulty measurement, according to some embodiments. State estimation module 318 (or GNSS module 218) receives (1202) a plurality of measurements (or the satellite navigation measurements 224) from a plurality of sensors (e.g., the sensors 174) of system 172 (or global navigation satellites 110-1 to 110-N) for a measurement epoch. Kalman filter module 320/370 (or Kalman filter module 220) uses (1204) a Kalman filter to calculate a state of system 172 (or the state 226 of the satellite navigation receiver 120) for the measurement epoch based on the plurality of sensor measurements (or the satellite navigation measurements). In some embodiments, the state of the satellite navigation receiver 120 includes a position of the satellite navigation receiver, a velocity of the satellite navigation receiver, and a time. In some embodiments, the state of system 172 (or satellite navigation receiver 120) for the measurement epoch is calculated using a first closed form update equation (e.g., Equation (11)). Faulty measurement module 372 detects (1206) a faulty measurement in the plurality of sensor measurements (or the satellite navigation measurement)s for the measurement epoch. Each reference to faulty measurement module 372 in this description of FIGS. 12-18 is to be understood to also be applicable to faulty measurement module 222 (FIG. 2) and faulty measurement module 322 (FIG. 3A). Operation 1206 is described in more detail below with respect to FIG. 13. Faulty measurement module 372 then calculates (1208) a revised state of system 172 (or satellite navigation receiver 120) for the measurement epoch that compensates for the faulty measurement, using the calculated state of system 172 (or satellite navigation receiver 120) for the measurement epoch as an input to the revised state calculation, and using a revised closed-form update equation comprising the first closed-form update equation modified with respect to the faulty measurement (e.g., using Equations (11) and (25)). Note that step 1208 is described in more detail below with respect to FIG. 14.

Figure 13:
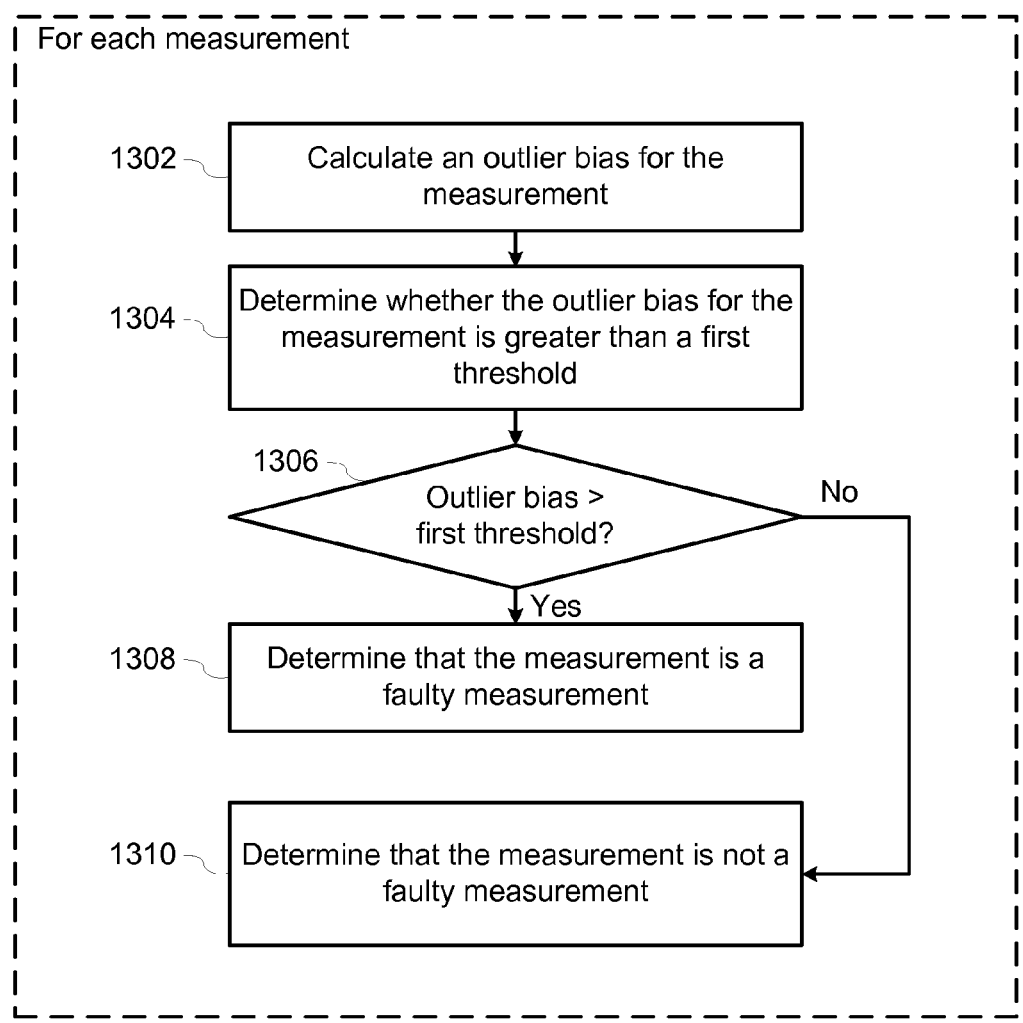
FIG. 13 is a flowchart of a method for detecting the faulty measurement, according to some embodiments.

FIG. 13 is a flowchart of a method for detecting (1206) the faulty measurement (or the satellite navigation measurement), according to some embodiments. For each measurement (or the satellite navigation measurement) in the plurality of measurements (or the satellite navigation measurements), faulty measurement module 372 calculates (1302) an outlier bias for the satellite navigation measurement. Faulty measurement module 372 determines (1304) whether the outlier bias for the measurement (or the satellite navigation measurement) is greater than a first threshold. If the outlier bias for the measurement (or the satellite navigation measurement) is greater than the first threshold (1306, yes), faulty measurement module 372 determines (1308) that the measurement (or the satellite navigation measurement) is a faulty measurement. If the outlier bias is below the first threshold (1306, no), faulty measurement module 372 determines (1310) that the measurement (or the satellite navigation measurement) is not a faulty measurement. This process is typically repeated for each and every one of the measurements (or the satellite navigation measurements) that has been used in the Kalman filter to update the state of the object (e.g., the satellite navigation receiver 120) or system being tracked by the Kalman filter. Optionally, in some circumstances the faulty measurement detection process is performed on a subset (less than all) of the measurements (or the satellite navigation measurements) received for a respective epoch. For example, if the number of faulty measurements for one epoch detected exceeds a predefined level, the remaining measurements may be assumed to be faulty as well, in which case the state may be revised so as to exclude the effect of all the measurements for that epoch.

Figure 14:
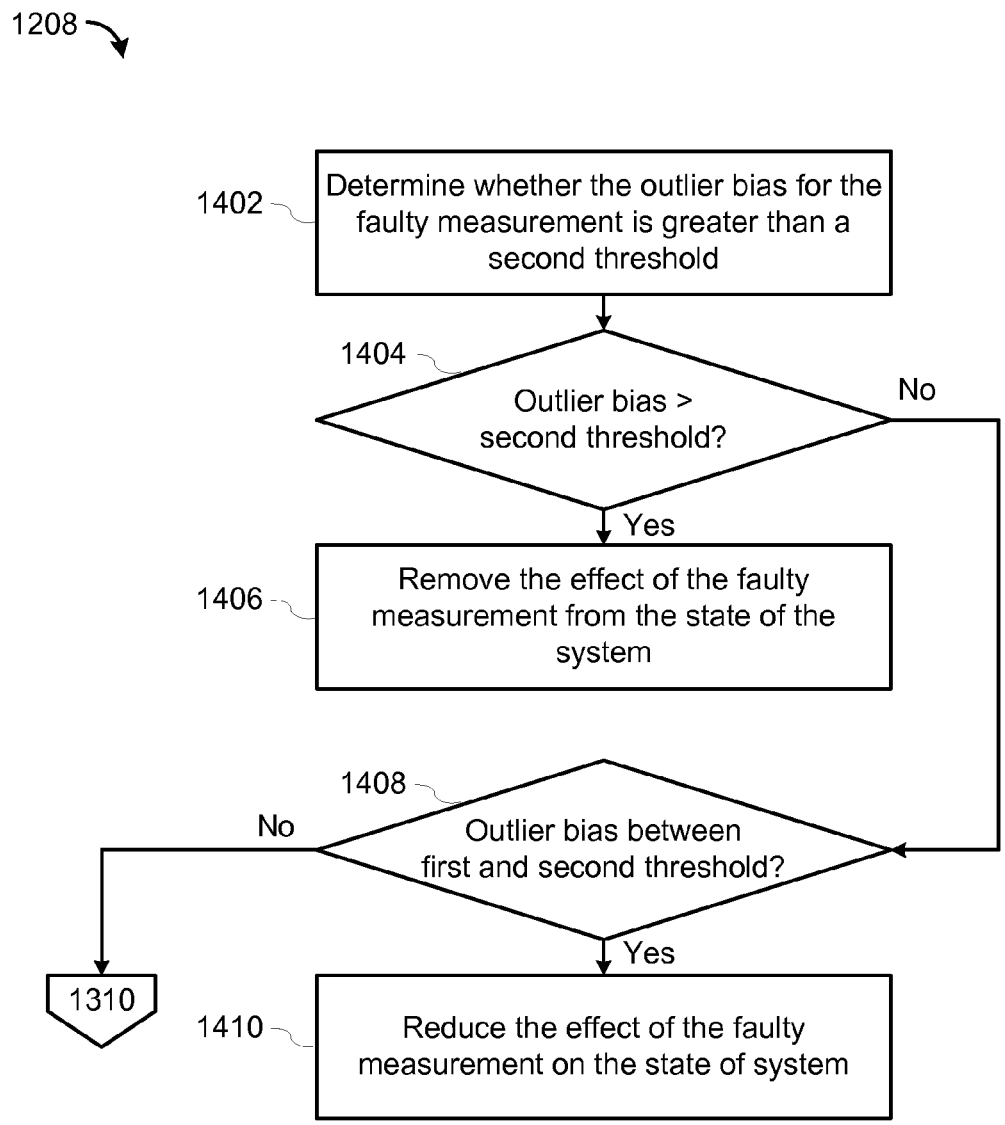
FIG. 14 is a flowchart of a method for calculating a revised state of a system for a measurement epoch that compensates for the faulty measurement, according to some embodiments.
Figure 15:
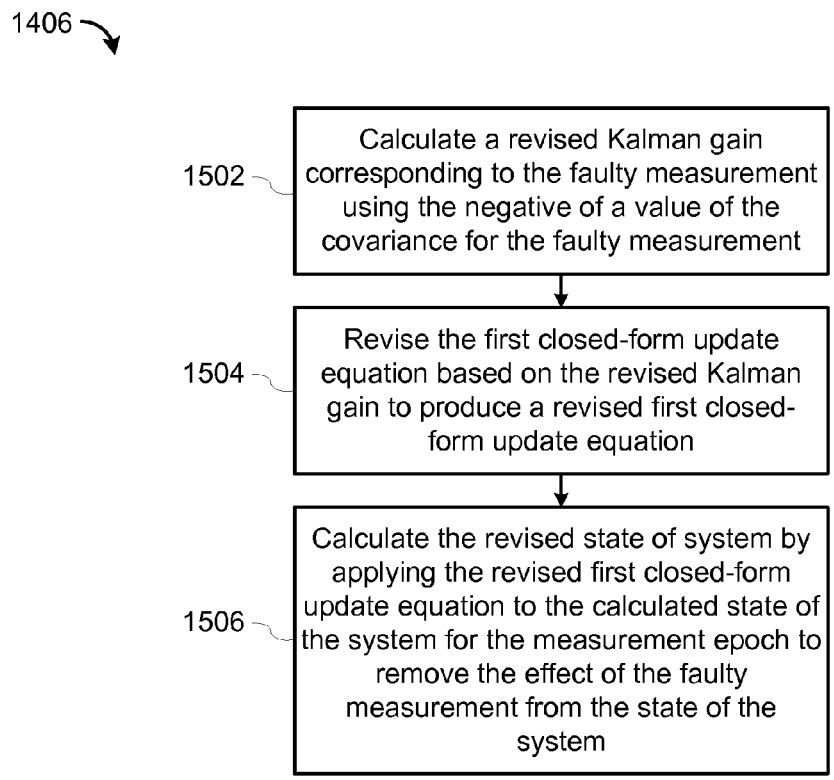
FIG. 15 is a flowchart of a method for removing the effect of the faulty measurement from the state of the system, according to some embodiments.

FIG. 14 is a flowchart of a method for calculating (1208, FIG. 12) a revised state of system 172 (or satellite navigation receiver 120) for a measurement epoch that compensates for the faulty measurement, according to some embodiments. Faulty measurement module 372 determines (1402) whether the outlier bias for the faulty measurement is above a second threshold, wherein the second threshold is greater than the first threshold. In some embodiments, the second threshold is the minimum detectable error threshold (e.g., as described with respect to Equation (30)).

If the outlier bias is greater than the second threshold (1404, yes), faulty measurement module 372 removes (1406) the effect of the faulty measurement from the state of system 172 (or satellite navigation receiver 120). Step 1406 is described in more detail with respect to FIG. 15, which is a flowchart of a method for removing (1406) the effect of the faulty measurement from the state of system 172 (or satellite navigation receiver 120), according to some embodiments. The faulty measurement module 372 calculates (1502, FIG. 15) a revised Kalman gain corresponding to the faulty measurement using the negative of a value of a covariance for the faulty measurement (e.g., Equation (25)), where the covariance for the faulty measurement is determined from a covariance matrix corresponding to the calculated state of the satellite navigation receiver. Faulty measurement module 372 revises (1504) the first closed-form update equation (e.g., Equation (11)) based on the revised Kalman gain to produce a revised first closed-form update equation (e.g., Equations (11) and (25)). Faulty measurement module 372 calculates (1506) the revised state of system 172 (or the satellite navigation receiver 120) by applying the revised first closed-form update equation to the calculated state of system 172 (or satellite navigation receiver 120) for the measurement epoch to remove the effect of the faulty measurement from the state of system 172 (or satellite navigation receiver 120).

Figure 16:
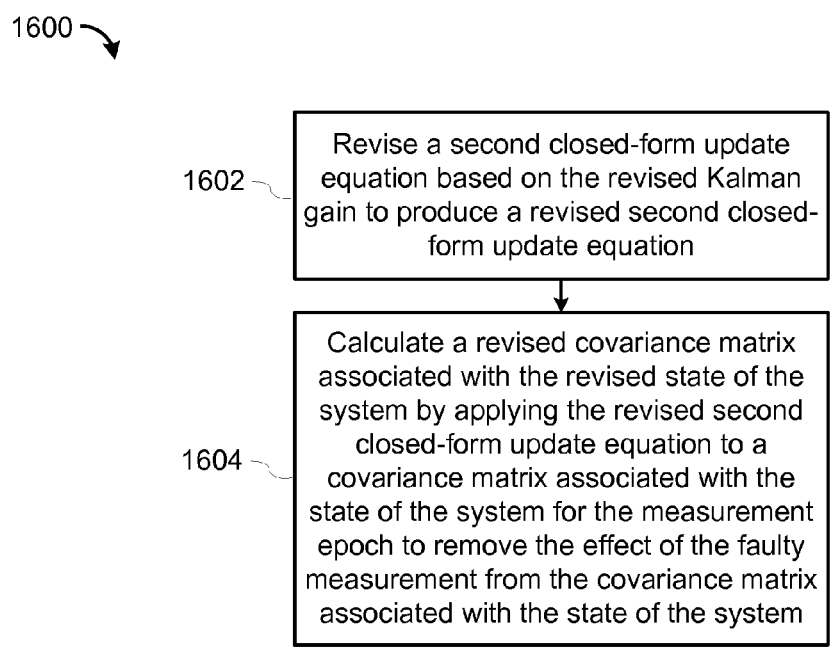
FIG. 16 is a flowchart of a method for calculating a revised covariance matrix associated with a revised state of the system, according to some embodiments.
Figure 17:
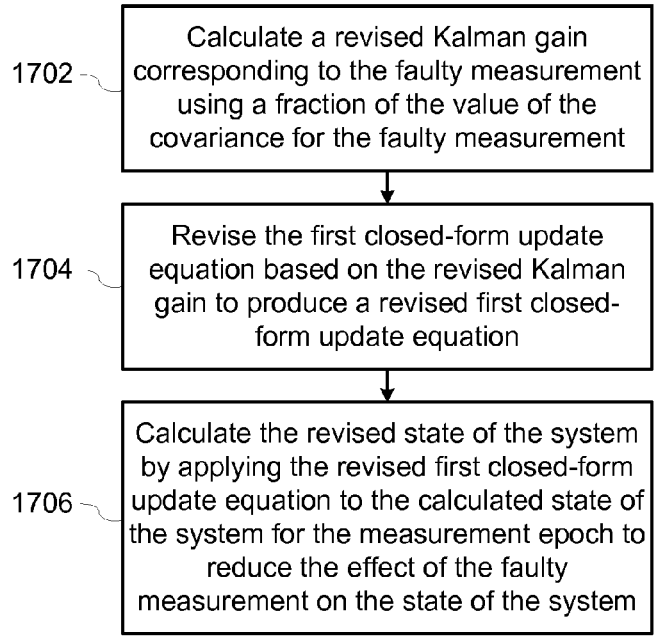
FIG. 17 is a flowchart of a method for reducing the effect of the faulty measurement on the state of the system, according to some embodiments.

After the revised state of system 172 (or satellite navigation receiver 120) for the measurement epoch has been calculated, a revised covariance matrix is calculated. FIG. 16 is a flowchart of a method 1600 for calculating a revised covariance matrix associated with a revised state of system 172 (or satellite navigation receiver 120), according to some embodiments. Faulty measurement module 372 revises (1602) a second closed-form update equation (e.g., Equation (12)) based on the revised Kalman gain (e.g., Equation (25)) to produce a revised second closed-form update equation (e.g., Equations (12) and (25)). Faulty measurement module 372 then calculates (1604) a revised covariance matrix associated with the revised state of system 172 (or satellite navigation receiver 120) by applying the revised second closed-form update equation to a covariance matrix associated with the state of system 172 (or satellite navigation receiver 120) for the measurement epoch to remove the effect of the faulty measurement from the covariance matrix associated with the state of system 172 (or satellite navigation receiver 120).

Returning to FIG. 14, if the outlier bias is between the first threshold and the second threshold (1404, no and 1408, yes), faulty measurement module 372 reduces (1410) the effect of the faulty measurement on the state of system 172 (or satellite navigation receiver 120). Step 1410 is described in more detail with respect to FIG. 17, which is a flowchart of a method for reducing the effect of the faulty measurement on the state of system 172 (or satellite navigation receiver 120), according to some embodiments. Faulty measurement module 372 calculates (1702, FIG. 17) a revised Kalman gain corresponding to the faulty measurement using a fraction of the value of the covariance for the faulty measurement (e.g., Equations (25) and (27)). Faulty measurement module 372 then revises (1704) the first closed-form update equation (e.g., Equations (11)) based on the revised Kalman gain to produce a revised first closed-form update equation (e.g., Equations (11), (25), and (27)). Faulty measurement module 372 calculates (1706) the revised state of system 172 (or satellite navigation receiver 120) by applying the revised first closed-form update equation to the calculated state of system 172 (or satellite navigation receiver 120) for the measurement epoch to reduce the effect of the faulty measurement on the state of system 172 (or satellite navigation receiver 120).

Figure 18:
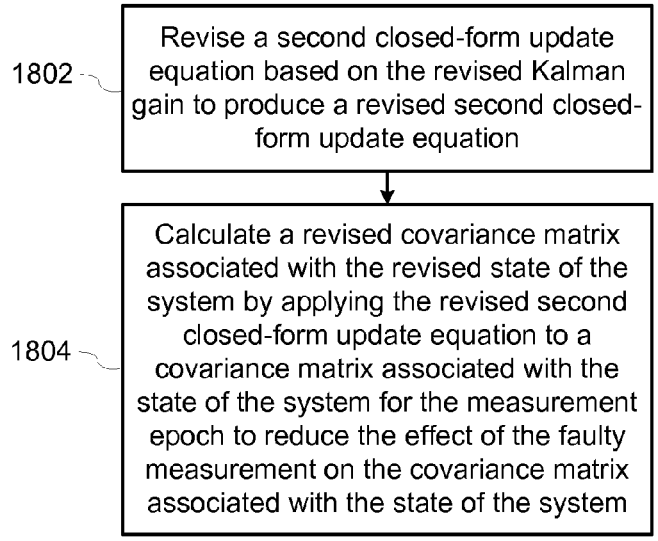
FIG. 18 is a flowchart of a method for calculating a revised covariance matrix associated with a revised state of the system, according to some embodiments.

After the revised state of system 172 (or satellite navigation receiver 120) for the measurement epoch has been calculated, a revised covariance matrix is calculated. FIG. 18 is a flowchart of a method 1800 for calculating a revised covariance matrix associated with a revised state of system 172 (or satellite navigation receiver 120), according to some embodiments. Faulty measurement module 372 revises (1802) a second closed-form update equation (e.g., Equation (12)) based on the revised Kalman gain (e.g., Equations (25) and (27)) to produce a revised second closed-form update equation (e.g., Equations (12), (25), and (27)). The faulty measurement module 372 calculates (1804) a revised covariance matrix associated with the revised state of system 172 (or satellite navigation receiver 120) by applying the revised second closed-form update equation to a covariance matrix associated with the state of system 172 (or satellite navigation receiver 120) for the measurement epoch to reduce the effect of the faulty measurement on the covariance matrix associated with the state of system 172 (or satellite navigation receiver 120).

Returning to FIG. 14, if the outlier bias is below the first threshold (1408, no), the process returns to step 1310 in FIG. 13.

Figure 19:
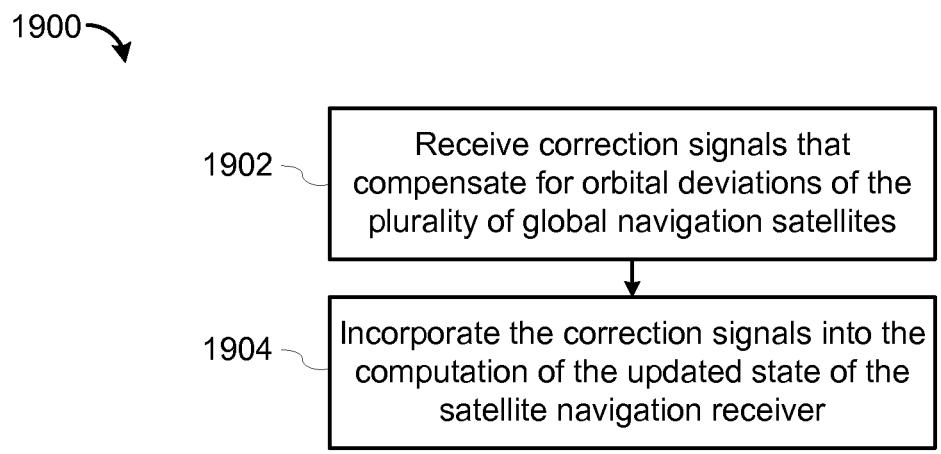
FIG. 19 is a flowchart of a method for adjusting the state of a satellite navigation receiver based on correction signals, according to some embodiments.

The following discussion applies to embodiments in which the methods described above are applied to satellite navigation signals received at the satellite navigation receiver 120. In some embodiments, the satellite navigation receiver 120 receives correction signals (e.g., correction signals 132) that correct for orbital deviations of the global navigation satellites. For example, satellite navigation receiver 120 may receive the correction signals 132 from computer system 130 via communication satellites 160-1 to 160-P. FIG. 19 is a flowchart of a method 1900 for adjusting the state of the satellite navigation receiver 120 based on correction signals, according to some embodiments. GNSS module 218 receives (1902) correction signals that compensate for orbital deviations of the plurality of global navigation satellites. GNSS module 218 then incorporates the correction signals (1904) into its computation of the updated state of the satellite navigation receiver. For example, GNSS module 218 may incorporate the correction signals by revising the navigation satellite measurements, prior to their use in computing an update state of satellite navigation receiver 120, so as to compensate for various sources of error, such as orbital deviation of the satellites from their predicted orbits (e.g., orbits predicted using the ephemeris data broadcast by the navigation satellites; ephemeris data for navigation satellites is also available from the GNSS (e.g., GPS) operations center or other service tasked with the timely distribution of ephemeris data), tropospheric effects and ionospheric effects.

The methods illustrated in FIGS. 4-19 may be governed by instructions that are stored in a computer readable storage medium and that are executed by one or more processors of one or more computer systems (e.g., computer system 130, satellite navigation receiver 120, etc.). Each of the operations shown in FIGS. 4-19 may correspond to instructions stored in a computer memory or computer readable storage medium. The computer readable storage medium may include a magnetic or optical disk storage device, solid state storage devices such as flash memory, or other non-volatile memory device or devices. The computer readable instructions stored on the computer readable storage medium are in source code, assembly language code, object code, or other instruction format that is interpreted and/or executable by one or more processors.

As discussed above, the methods described with respect to FIGS. 12-18 may be applied to any system. Several exemplary systems are discussed below.

In some embodiments, the system is a satellite navigation receiver, wherein the plurality of measurements comprise measurements of signals received from a plurality of global navigation satellites, and wherein the state of the satellite navigation receiver includes a position of the satellite navigation receiver, a velocity of the satellite navigation receiver, and a time. In some embodiments, correction signals that compensate for errors in predicted orbits and clocks of the plurality of global navigation satellites are received and the state of the satellite navigation receiver is adjusted based on the correction signals.

In some embodiments, wherein the system is a plurality of global navigation satellites, wherein the plurality of measurements comprise measurements of signals received from the plurality of global navigation satellites, and wherein the state of the plurality of global navigation satellites includes a position of each global navigation satellite in the plurality of global navigation satellites, a velocity of each global navigation satellite in the plurality of global navigation satellites, and a time reported by each global navigation satellite in the plurality of global navigation satellites. In some embodiments, the revised state of the plurality of global navigation satellites is used to calculate correction signals that compensate for errors in predicted orbits and clocks of the plurality of global navigation satellites and the correction signals are transmitted to one or more satellite navigation receivers.

In some embodiments, the system includes a power distribution network comprising one or more power plants and one or more power grids, wherein the plurality of measurements is received from a plurality of sensors for a power distribution network, and wherein the state of the system comprises a state of the power distribution network and includes a magnitude, frequency, and phase relationship of the one or more power plants, fuel flow to power generators of the one or more power plants, and an amount of power drawn by the power grid.

In some embodiments, the system is a weather system, wherein the plurality of measurements is received from a plurality of meteorological sensors distributed across a plurality of geographic locations in the weather system, and wherein the state of the weather system includes air temperature and wind speed at the plurality of geographic locations.

In some embodiments, the system is a radar system, wherein the plurality of measurements includes radar signals reflected from plurality of radar targets, and wherein the state of the radar system includes a distance to each radar target, a velocity of each radar target, and a time.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention various embodiments with various modifications as are suited to the particular use contemplated.

What is claimed is:

1. A computer-implemented method, comprising:
at a computer system including one or more processors and memory storing one or more programs, the one or more processors executing the one or more programs to perform the operations of:
 receiving a plurality of measurements in a system for a measurement epoch;
 using a Kalman filter to calculate a state of the system for the measurement epoch based on the plurality of measurements, wherein the state of the system for the measurement epoch is calculated using a first closed-form update equation;
 detecting a faulty measurement in the plurality of measurements for the measurement epoch; and
 calculating a revised state of the system for the measurement epoch that compensates for the faulty measurement, using the calculated state of the system for the measurement epoch as an input to the revised state calculation, and using a revised closed-form update equation comprising the first closed-form update equation modified with respect to the faulty measurement.

2. The method of claim 1, wherein detecting the faulty measurement in the plurality of measurements for the measurement epoch includes:
 for each measurement in the plurality of measurements,
  calculating an outlier bias for the measurement;
  determining whether the outlier bias for the measurement is greater than a first threshold; and
  if the outlier bias for the measurement is greater than the first threshold, determining that the measurement is a faulty measurement.

3. The method of claim 2, wherein calculating the revised state of the system for the measurement epoch that compensates for the faulty measurement includes:
 determining whether the outlier bias for the faulty measurement is above a second threshold, wherein the second threshold is greater than the first threshold; and
 if the outlier bias is greater than the second threshold, removing the effect of the faulty measurement from the calculated state of the system by:
  calculating a revised Kalman gain corresponding to the faulty measurement using the negative of a value of a covariance for the faulty measurement, where the covariance for the faulty measurement is determined from a covariance matrix corresponding to the calculated state of the system;
  revising the first closed-form update equation based on the revised Kalman gain to produce a revised first closed-form update equation, and
  calculating the revised state of the system by applying the revised first closed-form update equation to the calculated state of the system for the measurement epoch to remove the effect of the faulty measurement from the calculated state of the system.

4. The method of claim 3, including:
 revising a second closed-form update equation based on the revised Kalman gain to produce a revised second closed-form update equation, and
 calculating a revised covariance matrix associated with the revised state of the system by applying the revised second closed-form update equation to a covariance matrix associated with the calculated state of the system for the measurement epoch to remove the effect of the faulty measurement from the covariance matrix associated with the calculated state of the system.

5. The method of claim 3, wherein the second threshold is a minimum detectable error threshold.

6. The method of claim 3, wherein if the outlier bias is between the first threshold and the second threshold, the method includes reducing the effect of the faulty measurement on the calculated state of the system by:
 calculating a revised Kalman gain corresponding to the faulty measurement using a fraction of the value of the covariance for the faulty measurement;
 revising the first closed-form update equation based on the revised Kalman gain to produce a revised first closed-form update equation, and
 calculating the revised state of the system by applying the revised first closed-form update equation to the calculated state of the system for the measurement epoch to reduce the effect of the faulty measurement on the calculated state of the system.

7. The method of claim 6, including:
revising a second closed-form update equation based on the revised Kalman gain to produce a revised second closed-form update equation, and
calculating a revised covariance matrix associated with the revised state of the system by applying the revised second closed-form update equation to a covariance matrix associated with the calculated state of the system for the measurement epoch to reduce the effect of the faulty measurement on the covariance matrix associated with the calculated state of the system.

8. The method of claim 2, wherein if the outlier bias is below the first threshold, the method includes determining that the measurement is not a faulty measurement.

9. The method of claim 1, wherein the system is a satellite navigation receiver, wherein the plurality of measurements comprise measurements of signals received from a plurality of global navigation satellites, and wherein the state of the satellite navigation receiver includes a position of the satellite navigation receiver, a velocity of the satellite navigation receiver, and a time.

10. The method of claim 9, including:
receiving correction signals that compensate for errors in predicted orbits and clocks of the plurality of global navigation satellites; and
adjusting the state of the satellite navigation receiver based on the correction signals.

11. The method of claim 1, wherein the system is a plurality of global navigation satellites, wherein the plurality of measurements comprise measurements of signals received from the plurality of global navigation satellites, and wherein the state of the plurality of global navigation satellites includes a position of each global navigation satellite in the plurality of global navigation satellites, a velocity of each global navigation satellite in the plurality of global navigation satellites, and a time reported by each global navigation satellite in the plurality of global navigation satellites.

12. The method of claim 11, including:
using the revised state of the plurality of global navigation satellites to calculate correction signals that compensate for errors in predicted orbits and clocks of the plurality of global navigation satellites; and
transmitting the correction signals to one or more satellite navigation receivers.

13. The method of claim 1, wherein the system includes a power distribution network comprising one or more power plants and one or more power grids, wherein the plurality of measurements is received from a plurality of sensors for a power distribution network, and wherein the calculated state of the system comprises a calculated state of the power distribution network and includes a magnitude, frequency, and phase relationship of the one or more power plants, fuel flow to power generators of the one or more power plants, and an amount of power drawn by the power grid.

14. The method of claim 1, wherein the system is a weather system, wherein the plurality of measurements is received from a plurality of meteorological sensors distributed across a plurality of geographic locations in the weather system, and wherein the state of the weather system includes air temperature and wind speed at the plurality of geographic locations.

15. The method of claim 1, wherein the system is a radar system, wherein the plurality of measurements includes radar signals reflected from plurality of radar targets, and wherein the state of the radar system includes a distance to each radar target, a velocity of each radar target, and a time.

16. A computer system, comprising:
one or more processors;
memory; and
one or more programs stored in the memory, the one or more programs comprising instructions to:
receive a plurality of measurements in a system for a measurement epoch;
use a Kalman filter to calculate a state of the system for the measurement epoch based on the plurality of measurements, wherein the state of the system for the measurement epoch is calculated using a first closed-form update equation;
detect a faulty measurement in the plurality of measurements for the measurement epoch; and
calculate a revised state of the system for the measurement epoch that compensates for the faulty measurement, using the calculated state of the system for the measurement epoch as an input to the revised state calculation, and using a revised closed-form update equation comprising the first closed-form update equation modified with respect to the faulty measurement.

17. The computer system of claim 16, wherein the instructions to detect the faulty measurement in the plurality of measurements for the measurement epoch include instructions to:
for each measurement in the plurality of measurements, calculate an outlier bias for the measurement;
determine whether the outlier bias for the measurement is greater than a first threshold; and
if the outlier bias for the measurement is greater than the first threshold, determine that the measurement is a faulty measurement.

18. The computer system of claim 17, wherein the instructions to calculate the revised state of the system for the measurement epoch that compensates for the faulty measurement include instructions to:
determine whether the outlier bias for the faulty measurement is above a second threshold, wherein the second threshold is greater than the first threshold; and
if the outlier bias is greater than the second threshold, remove the effect of the faulty measurement from the calculated state of the system by:
calculating a revised Kalman gain corresponding to the faulty measurement using the negative of a value of a covariance for the faulty measurement, where the covariance for the faulty measurement is determined from a covariance matrix corresponding to the calculated state of the system;
revising the first closed-form update equation based on the revised Kalman gain to produce a revised first closed-form update equation, and
calculating the revised state of the system by applying the revised first closed-form update equation to the calculated state of the system for the measurement epoch to remove the effect of the faulty measurement from the calculated state of the system.

19. The computer system of claim 18, including instructions to:
revise a second closed-form update equation based on the revised Kalman gain to produce a revised second closed-form update equation, and
calculate a revised covariance matrix associated with the revised state of the system by applying the revised second closed-form update equation to a covariance matrix associated with the calculated state of the system for the measurement epoch to remove the effect of the faulty measurement from the covariance matrix associated with the calculated state of the system.

20. The computer system of claim 18, wherein the second threshold is a minimum detectable error threshold.

21. The computer system of claim 18, wherein if the outlier bias is between the first threshold and the second threshold, the one or more programs include instructions to reduce the effect of the faulty measurement on the calculated state of the system by:
 calculating a revised Kalman gain corresponding to the faulty measurement using a fraction of the value of the covariance for the faulty measurement;
 revising the first closed-form update equation based on the revised Kalman gain to produce a revised first closed-form update equation, and
 calculating the revised state of the system by applying the revised first closed-form update equation to the calculated state of the system for the measurement epoch to reduce the effect of the faulty measurement on the calculated state of the system.

22. The computer system of claim 21, including instructions to:
 revise a second closed-form update equation based on the revised Kalman gain to produce a revised second closed-form update equation, and
 calculate a revised covariance matrix associated with the revised state of the system by applying the revised second closed-form update equation to a covariance matrix associated with the calculated state of the system for the measurement epoch to reduce the effect of the faulty measurement on the covariance matrix associated with the calculated state of the system.

23. The computer system of claim 17, wherein if the outlier bias is below the first threshold, the one or more programs include instructions to determine that the measurement is not a faulty measurement.

24. The computer system of claim 16, wherein the system is a satellite navigation receiver, wherein the plurality of measurements comprise measurements of signals received from a plurality of global navigation satellites, and wherein the state of the satellite navigation receiver includes a position of the satellite navigation receiver, a velocity of the satellite navigation receiver, and a time.

25. The computer system of claim 24, including instructions to:
 receive correction signals that compensate for errors in predicted orbits and clocks of the plurality of global navigation satellites; and
 adjust the state of the satellite navigation receiver based on the correction signals.

26. The computer system of claim 16, wherein the system is a plurality of global navigation satellites, wherein the plurality of measurements comprise measurements of signals received from the plurality of global navigation satellites, and wherein the state of the plurality of global navigation satellites includes a position of each global navigation satellite in the plurality of global navigation satellites, a velocity of each global navigation satellite in the plurality of global navigation satellites, and a time reported by each global navigation satellite in the plurality of global navigation satellites.

27. The computer system of claim 26, including instructions to:
 use the revised state of the plurality of global navigation satellites to calculate correction signals that compensate for errors in predicted orbits and clocks of the plurality of global navigation satellites; and
 transmit the correction signals to one or more satellite navigation receivers.

28. The computer system of claim 16, wherein the system includes a power distribution network comprising one or more power plants and one or more power grids, wherein the plurality of measurements is received from a plurality of sensors for a power distribution network, and wherein the calculated state of the system comprises a state of the power distribution network and includes a magnitude, frequency, and phase relationship of the one or more power plants, fuel flow to power generators of the one or more power plants, and an amount of power drawn by the power grid.

29. The computer system of claim 16, wherein the system is a weather system, wherein the plurality of measurements is received from a plurality of meteorological sensors distributed across a plurality of geographic locations in the weather system, and wherein the state of the weather system includes air temperature and wind speed at the plurality of geographic locations.

30. The computer system of claim 16, wherein the system is a radar system, wherein the plurality of measurements includes radar signals reflected from plurality of radar targets, and wherein the state of the radar system includes a distance to each radar target, a velocity of each radar target, and a time.

31. A non-transitory computer readable storage medium storing one or more programs configured for execution by a computer, the one or more programs comprising instructions to:
 receive a plurality of measurements in a system for a measurement epoch;
 use a Kalman filter to calculate a state of the system for the measurement epoch based on the plurality of measurements, wherein the state of the system for the measurement epoch is calculated using a first closed-form update equation;
 detect a faulty measurement in the plurality of measurements for the measurement epoch; and
 calculate a revised state of the system for the measurement epoch that compensates for the faulty measurement, using the calculated state of the system for the measurement epoch as an input to the revised state calculation, and using a revised closed-form update equation comprising the first closed-form update equation modified with respect to the faulty measurement.

32. The computer readable storage medium of claim 31, wherein the instructions to detect the faulty measurement in the plurality of measurements for the measurement epoch include instructions to:
 for each measurement in the plurality of measurements,
  calculate an outlier bias for the measurement;
  determine whether the outlier bias for the measurement is greater than a first threshold; and
  if the outlier bias for the measurement is greater than the first threshold, determine that the measurement is a faulty measurement.

33. The computer readable storage medium of claim 32, wherein the instructions to calculate the revised state of the system for the measurement epoch that compensates for the faulty measurement include instructions to:
 determine whether the outlier bias for the faulty measurement is above a second threshold, wherein the second threshold is greater than the first threshold; and
 if the outlier bias is greater than the second threshold, remove the effect of the faulty measurement from the calculated state of the system by:
  calculating a revised Kalman gain corresponding to the faulty measurement using the negative of a value of a covariance for the faulty measurement, where the covariance for the faulty measurement is determined from a covariance matrix corresponding to the calculated state of the system;
revising the first closed-form update equation based on the revised Kalman gain to produce a revised first closed-form update equation, and
calculating the revised state of the system by applying the revised first closed-form update equation to the calculated state of the system for the measurement epoch to remove the effect of the faulty measurement from the calculated state of the system.

34. The computer readable storage medium of claim 33, including instructions to:
revise a second closed-form update equation based on the revised Kalman gain to produce a revised second closed-form update equation, and
calculate a revised covariance matrix associated with the revised state of the system by applying the revised second closed-form update equation to a covariance matrix associated with the calculated state of the system for the measurement epoch to remove the effect of the faulty measurement from the covariance matrix associated with the calculated state of the system.

35. The computer readable storage medium of claim 33, wherein the second threshold is a minimum detectable error threshold.

36. The computer readable storage medium of claim 33, wherein if the outlier bias is between the first threshold and the second threshold, the one or more programs include instructions to reduce the effect of the faulty measurement on the calculated state of the system by:
calculating a revised Kalman gain corresponding to the faulty measurement using a fraction of the value of the covariance for the faulty measurement;
revising the first closed-form update equation based on the revised Kalman gain to produce a revised first closed-form update equation, and
calculating the revised state of the system by applying the revised first closed-form update equation to the calculated state of the system for the measurement epoch to reduce the effect of the faulty measurement on the calculated state of the system.

37. The computer readable storage medium of claim 36, including instructions to:
revise a second closed-form update equation based on the revised Kalman gain to produce a revised second closed-form update equation, and
calculate a revised covariance matrix associated with the revised state of the system by applying the revised second closed-form update equation to a covariance matrix associated with the calculated state of the system for the measurement epoch to reduce the effect of the faulty measurement on the covariance matrix associated with the calculated state of the system.

38. The computer readable storage medium of claim 32, wherein if the outlier bias is below the first threshold, the one or more programs include instructions to determine that the measurement is not a faulty measurement.

39. The computer readable storage medium of claim 31, wherein the system is a satellite navigation receiver, wherein the plurality of measurements comprise measurements of signals received from a plurality of global navigation satellites, and wherein the state of the satellite navigation receiver includes a position of the satellite navigation receiver, a velocity of the satellite navigation receiver, and a time.

40. The computer readable storage medium of claim 39, including instructions to:
receive correction signals that compensate for errors in predicted orbits and clocks of the plurality of global navigation satellites; and
adjust the state of the satellite navigation receiver based on the correction signals.

41. The computer readable storage medium of claim 31, wherein the system is a plurality of global navigation satellites, wherein the plurality of measurements comprise measurements of signals received from the plurality of global navigation satellites, and wherein the state of the plurality of global navigation satellites includes a position of each global navigation satellite in the plurality of global navigation satellites, a velocity of each global navigation satellite in the plurality of global navigation satellites, and a time reported by each global navigation satellite in the plurality of global navigation satellites.

42. The computer readable storage medium of claim 41, including instructions to:
use the revised state of the plurality of global navigation satellites to calculate correction signals that compensate for errors in predicted orbits and clocks of the plurality of global navigation satellites; and
transmit the correction signals to one or more satellite navigation receivers.

43. The computer readable storage medium of claim 31, wherein the system includes a power distribution network comprising one or more power plants and one or more power grids, wherein the plurality of measurements is received from a plurality of sensors for a power distribution network, and wherein the calculated state of the system comprises a state of the power distribution network and includes a magnitude, frequency, and phase relationship of the one or more power plants, fuel flow to power generators of the one or more power plants, and an amount of power drawn by the power grid.

44. The computer readable storage medium of claim 31, wherein the system is a weather system, wherein the plurality of measurements is received from a plurality of meteorological sensors distributed across a plurality of geographic locations in the weather system, and wherein the state of the weather system includes air temperature and wind speed at the plurality of geographic locations.

45. The computer readable storage medium of claim 31, wherein the system is a radar system, wherein the plurality of measurements includes radar signals reflected from plurality of radar targets, and wherein the state of the radar system includes a distance to each radar target, a velocity of each radar target, and a time.

46. The method of claim 1, furthering including:
calculating a plurality of residuals corresponding to a subset of the plurality of measurements using the calculated state of the system;
calculating a metric for the plurality of residuals; and
for each respective measurement of two or more measurements in the subset of the plurality of measurements,
calculating an outlier bias for the respective measurement in the two or more measurements corresponding to a respective residual using the respective residual and the metric for the plurality of residuals;
determining whether the outlier bias for the measurement is greater than a first threshold; and
if the outlier bias for the measurement is greater than the first threshold, determining that the measurement is a faulty measurement.

47. The computer system of claim 17, wherein the instructions to calculate the outlier bias for the measurement further include instructions to:
- calculate a plurality of residuals corresponding to a subset of the plurality of measurements using the calculated state of the system;
- calculate a metric for the plurality of residuals; and
- for each respective measurement of two or more measurements in the subset of the plurality of measurements,
  - calculate an outlier bias for the respective measurement in the two or more measurements corresponding to a respective residual using the respective residual and the metric for the plurality of residuals;
  - determine whether the outlier bias for the measurement is greater than a first threshold; and
  - if the outlier bias for the measurement is greater than the first threshold, determine that the measurement is a faulty measurement.

48. The computer readable storage medium of claim 32, wherein the instructions to calculate the outlier bias for the measurement further include instructions to:
- calculate a plurality of residuals corresponding to a subset of the plurality of measurements using the calculated state of the system;
- calculate a metric for the plurality of residuals; and
- for each respective measurement of two or more measurements in the subset of the plurality of measurements,
  - calculate an outlier bias for the respective measurement in the two or more measurements corresponding to a respective residual using the respective residual and the metric for the plurality of residuals;
  - determine whether the outlier bias for the measurement is greater than a first threshold; and
  - if the outlier bias for the measurement is greater than the first threshold, determine that the measurement is a faulty measurement.

* * * * *

UNITED STATES PATENT AND TRADEMARK OFFICE
CERTIFICATE OF CORRECTION

PATENT NO. : 8,416,133 B2
APPLICATION NO. : 12/898629
DATED : April 9, 2013
INVENTOR(S) : Ronald R. Hatch and Liwen L. Dai It is certified that error appears in the above-identified patent and that said Letters Patent is hereby corrected as shown below:

In the Specification

Please delete the following text on lines 42-46 of Column 14:

"When this is done, only equation (10) for the gain is affected. Equations (11) and (12) are not affected. Equation (10) becomes:

$$k_j = (P_k^{j-1} h_j^T)_j / (h_j P_k^{j-1} h_j^T - r_j) \qquad (25)\text{,,}$$

and replace with the following text:

When this is done, equation (10) for the gain is affected. Equations (11) and (12) are not affected. Equation (10) becomes:

$$k_j = \left(P_k^j h_j^T\right)_j / (h_j P_k^j h_j^T - r_j) \qquad \{25\}$$

Signed and Sealed this
Twenty-first Day of April, 2015

Michelle K. Lee
*Director of the United States Patent and Trademark Office*